(12) United States Patent
Oikawa et al.

(10) Patent No.: US 7,840,804 B2
(45) Date of Patent: Nov. 23, 2010

(54) ATTRIBUTE CERTIFICATE VALIDATION METHOD AND DEVICE

(75) Inventors: Mitsuhiro Oikawa, Fujisawa (JP);
Yutaka Tagawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1247 days.

(21) Appl. No.: 11/340,788

(22) Filed: Jan. 27, 2006

(65) Prior Publication Data

US 2006/0277417 A1    Dec. 7, 2006

(30) Foreign Application Priority Data

Jun. 3, 2005    (JP)    ............... 2005-164233

(51) Int. Cl.
*H04L 9/32*    (2006.01)
(52) U.S. Cl. .............. 713/168; 380/277; 380/278; 380/279; 713/155; 713/156; 713/157; 713/158; 713/159; 713/169; 713/170; 713/171; 713/172; 726/26; 726/27; 726/28
(58) Field of Classification Search ......... 380/277–279, 380/281, 283, 285, 44, 45; 726/1, 2, 26, 726/27, 28; 713/150, 156, 155, 168–172, 713/176, 175; 709/229, 225
See application file for complete search history.

(56) References Cited

U.S. PATENT DOCUMENTS 5,757,925 A * 5/1998 Faybishenko ............... 709/203
6,983,371 B1 * 1/2006 Hurtado et al. ............. 713/189
2006/0106836 A1 * 5/2006 Masugi et al. .............. 707/101

FOREIGN PATENT DOCUMENTS

JP    2001-188757    * 10/2001
JP    2003-348077    12/2003

OTHER PUBLICATIONS

Information Technology—Open Systems Interconnection—The Directory: Public-Key and Attribute Certificate Frameworks (ITU-T Recommendation X.509); published from International Telecommunication Union; Switzerland; Mar. 31, 2000.

* cited by examiner

*Primary Examiner*—Taghi T Arani
*Assistant Examiner*—Josnel Jeudy
(74) *Attorney, Agent, or Firm*—Antonelli, Terry, Stout & Kraus, LLP.

(57) ABSTRACT

To verify a qualification on a network without notifying verifier privacy information that can identify as a subject of a public key certificate while keeping safety of the public key infrastructure technology. An attribute certificate validation method wherein by preparing an environment in which only an attribute certificate validation device operated by a trusted third party can access a user's public key certificate, the verifier transmits attribute certificate and signed data received from a user having presented a qualification, to the attribute certificate validation device to thereby request the device to make a check to confirm authenticity of the holder of the attribute certificate, thereby preventing the public key certificate (particularly, privacy information contained in the public key certificate) of the user from being passed to the verifier.

15 Claims, 15 Drawing Sheets

ATTRIBUTE CERTIFICATE VALIDATION METHOD AND DEVICE

INCORPORATION BY REFERENCE

This application claims priority based on a Japanese patent application, No. 2005-164233 filed on Jun. 3, 2005, the entire contents of which are incorporated herein by reference.

BACKGROUND OF THE INVENTION

The present invention relates to a technique suitable to safely verify only a qualification and/or a privilege without giving information identifying an individual and a device contained in a public key certificate to a verifier.

In services provided on a network, there is employed an authentication method using a public key certificate to identify a communication partner. In this regard, a method using an attribute certificate is known as the method of verifying a qualification and a privilege with safety at a public key cryptography level. For example, reference is to be made to "Information technology—Open systems interconnection—The Directory: Public-key and attribute certificate frameworks (ITU-T Recommendation X.509)" published from International Telecommunication Union, (Switzerland) on Mar. 31, 2000. The public key certificate is data in which a value of a public key is linked with a name, an identification number of a device, or the like of a subject possessing a private key corresponding to the public key, and the contents thereof are guaranteed by a digital signature of a certification authority.

The attribute certificate is data in which information identifying a public key certificate is linked with attribute information possessed by a subject of the public key certificate, and contents thereof are guaranteed by a digital signature of an attribute authority. In this connection, the information identifying a public key certificate generally includes an issuer name and a serial number of the public key certificate and does not include information individually identifying the subject of the public key certificate such as identification information identifying a name and a device of the subject of the public key certificate.

Moreover, to verify a qualification using an attribute certificate, there are employed in addition to the attribute certificate a digital signature of a holder of the attribute certificate and a public key certificate corresponding to the attribute certificate as well as a public key certificate constituting a certification path from a certificate of a certification authority trusted by the holder to the attribute certificate and the public key certificate and revocation information about each certificate in the certification path.

The methods to efficiently verify an attribute certificate includes a method in which a verifier transmits an attribute certificate to be verified and a public key certificate of a trusted certification authority to an attribute certificate validation device and the validation device delegates validation processing to return a result thereof to the verifier. For example, reference is to be made to JP-A-2003-348077.

SUMMARY OF THE INVENTION

In the conventional qualification verification method using an attribute certificate, a public key certificate of the subject of the attribute certificate is required at verification, and hence information capable of identifying an entity such as a name and a device number of the subject of the certificate described in the public key certificate is known to the verifier.

Inherently, the qualification verification is sufficiently and fully achieved by presenting to the verifier only information regarding a qualification of the side having showed the qualification, and it is not required that privacy information such as a name is known to the verifier. For example, when there exists a service accessible only by persons who is at least 20 years old, it is necessary for the service provider side to check only attribute information of the age of the user attempting to access the service. However, when the verification is conducted on the basis of the public key certificate, a name or the like described in the public key certificate is known to the service provider side, and hence there arises a fear of an invasion of user's privacy.

The present invention provides an attribute certificate validation method and an attribute certificate validation device for safely verifying only a qualification and a privilege while preventing privacy information identifying an individual and a device contained in a public key certificate from being known to a verifier (a service provider device 150 in the embodiment).

The gist of the present invention resides in that there is provided an environment in which only an attribute certificate validation device operated by a trusted third party can access a public key certificate, and a verifier (a service provider device 150 in the example of the embodiment) transmits, to an attribute certificate validation device (a reference numeral 130 in the example of the embodiment), attribute certificate information and signed data information received from a user having presented a qualification (a user device 140 in the embodiment)to thereby request the attribute certificate validation device to check authenticity of the holder of the attribute certificate, thereby implementing an attribute certificate validation method in which the public key certificate (particularly, privacy information contained in the public key certificate) of the user (e.g., the user device 140) is not passed to the verifier (e.g., the service provider device 150).

Additionally, a specific attribute certificate validation method includes a procedure as below. That is, in an attribute certificate validation method for a service provider device providing services on a network to check attribute information of a subject using the services, a user device utilized by the subject conducts a signed data transmitting step in which the device generates signed data including data to be signed required to receive a service provided by the service provider device, a signature value generated when a digital signature is made to the data to be signed using a private key corresponding to a public key certificate of the subject, and attribute certificate information required for an attribute certificate validation device to check integrity of an attribute certificate linked with the public key certificate of the subject, the signed data not including the public key certificate of the subject, and transmits the signed data to the service provider device;

the service provider device conducts a validation request data transmitting step in which the device receives the signed data from the user device, generates validation request data including signature verification information which can be calculated using the data to be signed in the signed data and which is required for an attribute certificate validation device to check the signature value, the signature value in the signed data, and the attribute certificate information in the signed data, and transmits the validation request data to an attribute certificate validation device delegating validation of the attribute certificate;

the attribute certificate validation device conducts an attribute certificate validating step in which the device receives the validation request data from the service provider device, and checks authenticity of a holder of the attribute certificate and integrity of contents of the attribute certificate by constructing each certification path, verifying the path, and checks validity of the path by use of the signature verification information in the validation request data, the signature value in the validation request data, the trust anchor information necessary to construct a certification path, an attribute certificate obtained from the attribute certificate information in the validation request data, and the public key certificate of the subject acquired from the certification authority device according to contents described in the attribute certificate; the attribute certificate validation device conducts a validation response transmitting step in which the device generates validation response data including the validation result and returns the validation response data to the service provider device; and the service provider device conducts an attribute validation result transmitting step in which the device receives the validation response data from the attribute certificate validation device and transmits the verification result regarding attributes of the subject to the user device according the validation result of the attribute certificate contained in the validation response data.

Furthermore, a specific attribute certificate validation device has a configuration as below. That is, an attribute certificate validation device for a service provider device providing services on a network to check attribute information of a subject using the services includes a validation request data receiving function to receive the validation request data from the service provider device;

a trust anchor acquiring function to acquire the trust anchor information;

an attribute certificate validating function to check authenticity of a holder of the attribute certificate and integrity of contents of the attribute certificate by constructing each certification path, verifying the path, and to check validity of the path by use of the signature verification information in the validation request data, the signature value in the validation request data, the trust anchor information acquired by the trust anchor acquiring function, an attribute certificate obtained from the attribute certificate information in the validation request data, and the public key certificate of the subject acquired from the certification authority device according to contents described in the attribute certificate;

a validation response data generating function to generate validation response data according to a validation result of the attribute certificate validating function; and a validation response data returning function to return the validation response data to the service provider device.

According to the present invention, a qualification and a privilege can be verified with safety at a public key cryptography level while preventing privacy information identifying an individual and a device contained in a public key certificate from being known to a verifier. That is, it is possible to implement qualification verification in consideration of privacy protection, for example, prevention of identification and tracing of a user.

As above, in network services verifying only qualifications such as a member, an age, a sex, and an access right, by preparing an environment capable of using an attribute certificate validation device, it is possible to implement qualification certification in consideration of privacy in which a public key certificate of a user is not presented to a service provider.

These and other benefits are described throughout the present specification. A further understanding of the nature and advantages of the invention may be realized by reference to the remaining portions of the specification and the attached drawings.

DETAILED DESCRIPTION OF THE EMBODIMENTS

Figure 1:
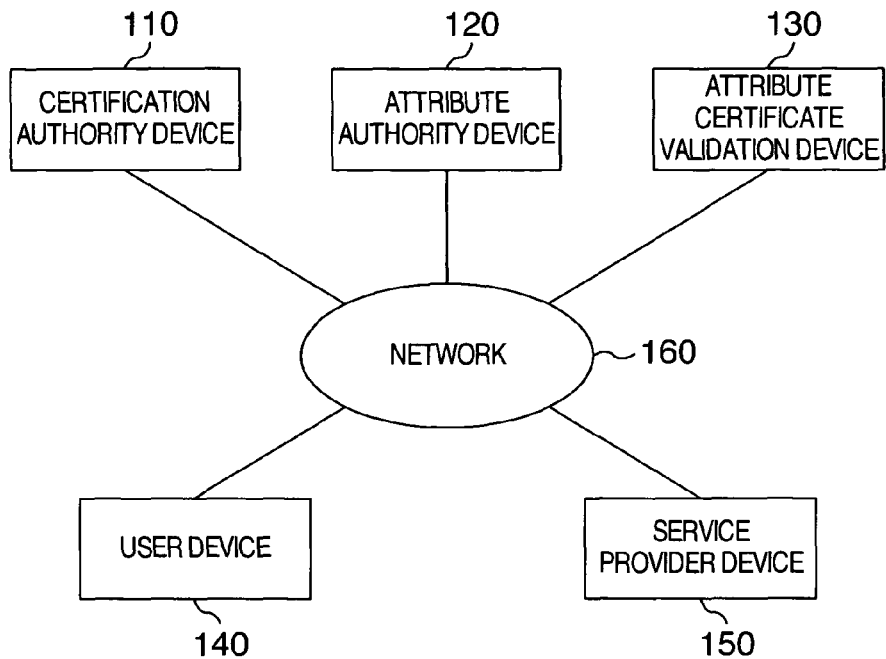
FIG. 1 is a diagram exemplifying a system configuration to apply an attribute certificate validation device according to an embodiment of the present invention.

Referring to the drawings, description will be given in detail of an attribute certificate validation method and an attribute certificate validation device according to an embodiment of the present invention. In this connection, in the drawings to be described below, the same reference numerals indicate the similar parts or elements. Moreover, the present invention is not restricted by the parts and elements described below.

FIG. 1 is a diagram showing a system configuration to apply an attribute certificate validation device according to an embodiment of the present invention. A certification authority device 110 to issue a public key certificate to each entity, an attribute authority device 120 to issue an attribute certificate assigned with an attribute value for the public key certificate issued by the certification authority device 110, an attribute certificate validation device 130 to delegate check of authenticity of a holder (a user device 140 in the example of the embodiment) of an attribute certificate transmitted from a verifier (a service provider device 150 in the example of the embodiment), a user device 140 which is a terminal on the side to use services, and a service provider device 150 which is a device on the side to provide services including qualification verification are connected via a network 160 to each other.

The certification authority device 110 is safely operated by a trusted certification authority. Also, the attribute authority device 120 is safely operated by a trusted attribute authority. Furthermore, the attribute certificate validation device 130 is safely operated by a trusted organization.

Figure 2:
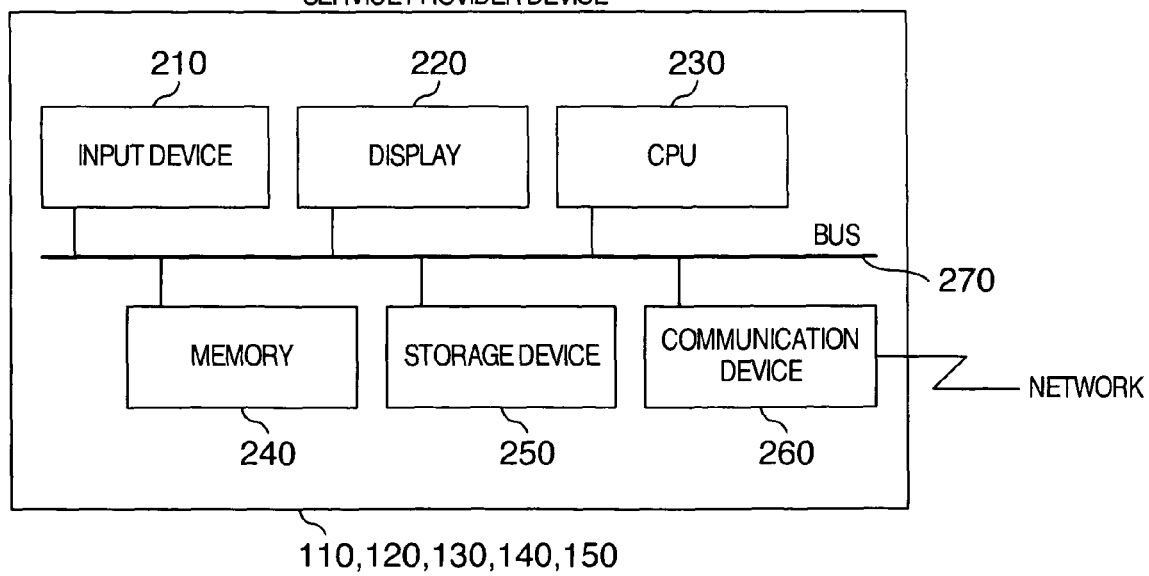
FIG. 2 is a diagram exemplifying a hardware configuration of the attribute certificate validation device according to an embodiment of the present invention as well as a certification authority device, an attribute authority device, a user device, and a service provider device.

FIG. 2 is a diagram showing a hardware configuration of the attribute certificate validation device 130 as well as the certification authority device 110, the attribute authority device 120, the user device 140, and the service provider device 150 shown in FIG. 1.

The devices 110 to 150 shown in FIG. 1 are configured such that an input device 210, a display 220, a central processing unit (CPU) 230, a memory 240, a storage device 250, and a communication device 260 are connected via a bus 270 to each other.

The input device 210 is used by a user of the devices 110 to 150 to input data, an instruction, and the like and includes a keyboard, a mouse, and the like. Also, the display 220 is used to display a message and the like to a user of the devices 110 to 150 and includes a cathode-ray tube (CRT), a liquid-crystal display, and the like. In addition, the CPU 230 controls in a unified manner the constituent elements of the devices 110 to 150 and conducts various arithmetic processing by executing programs stored in the memory 240 and the storage device 250.

Moreover, the memory 240 temporarily stores programs and data necessary for the processing shown in FIGS. 3 to 7. In addition, the storage device 250 is used to permanently store programs and data used by the devices 110 to 150, and includes a hard disk or the like. Also, the communication device 260 is an interface to communicate data via the network 160 with the devices 110 to 150 shown in FIG. 1. Furthermore, the bus 270 is a transmission path to communicate data between the constituent elements 210 to 260 and there may be used a transmission path other than a bus.

Each program shown in FIGS. 3 to 7 may be stored in the storage device 250 in advance or may be introduced to the storage device 250 when necessary via a installable and removable recording medium or communication medium (a communication line or a carrier and a digital signal on a communication line) which can be used by the devices 110 to 150. As is well-known in the art, the hard disk (mentioned in the previous paragraph) and the removable recording medium are processor-readable storage medium (i.e., readable by a processor such as CPU 230 shown in FIG. 2), and also are non-volatile (i.e., non-transitory) storage medium which maintain their recorded data through powered and non-powered states.

Figure 3:
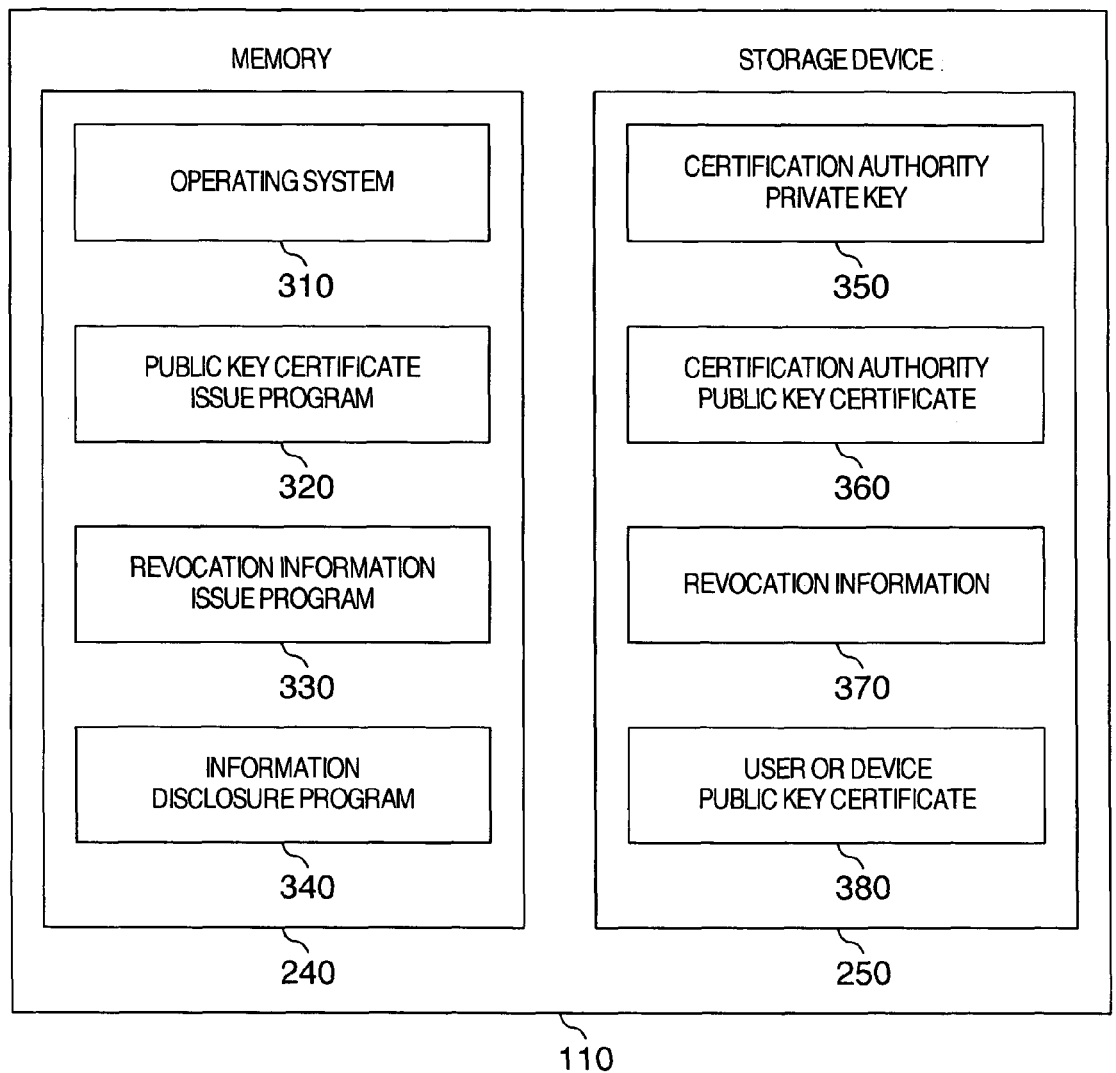
FIG. 3 is a diagram exemplifying a software configuration of a certification authority device associated with the embodiment.

FIGS. 3 to 7 show software configurations for the devices 110 to 150. FIG. 3 is a diagram showing a software configuration of the certification authority device 110.

The memory 240 of the certification authority device 110 temporarily stores programs such as an operating system 310, a public key certificate issue program 320, a revocation information issue program 330, and an information disclosure program 340. Also, the storage device 250 of the certification authority device 110 stores data such as a private key 350 possessed by a certification authority, a public key certificate 360 of the certification authority corresponding to the private key, revocation information 370 regarding the public key certificate issued from the certification authority, and a public key certificate 380 issued from the certification authority to each user or device.

The operating system 310 is a program to implement functions such as file control, process control, and device control to entirely control the certification authority device 110. In addition, the public key certificate issue program 320 is a program which links for a user an identification name of the user with a public key possessed by the user to issue a public key certificate in which a digital signature is made for the linked information using a private key of the certification authority.

The certification authority device 110 issues a public key certificate 360 of a certification authority for the certification authority itself, a public key certificate 460 for an attribute authority operating the attribute authority device 120, a public key certificate 550 for the attribute certificate validation device 130, and a public key certificate 380 for a user using the user device 140 or the user device 140 itself. Also, a revocation information issue program 630 is a program which generates, for the public key certificates issued from the certification authority, revocation information 370 for which a digital signature is made using the private key of the certification authority, in a list of information of revoked public key certificates. The generated revocation information is kept in the storage device 250. Moreover, the information disclosure program 340 is a program which discloses, in response to an enquiry from a user, the revocation information 370 and the public key certificate 380 of the user or the device in the storage device 250 of the certification authority device 110.

The information disclosure program 340 controls the public key certificate 380 of the user of the device such that the certificate is open to only an access from the attribute certificate validation device 130 (the certification authority device 110 responds only to an access from the attribute certificate validation device 130 to open the public key certificate 380 of the user to the public). A method of judging whether or not an access under consideration is an access made from the attribute certificate validation device 130 is implemented by an existing mechanism such as an SSL client validation or the like. The private key 350 of the certification authority is private key information possessed by the certification authority and is safely controlled in the certification authority.

Furthermore, the public key certificate 360 of the certification authority is a public key certificate with a self-signature issued to itself by the public key certificate issue program 320. Also, the revocation information 370 is information generated from the revocation information issue program 330 to make a check to confirm whether or not the public key certificate has been revoked, and corresponds, for example, to a certificate revocation list (CRL) or the like. Additionally, the public key certificate 380 of the user or the device is a public key certificate issued from the public key certificate issue program 320 to the user or the user device 140 used by the user.

Figure 4:
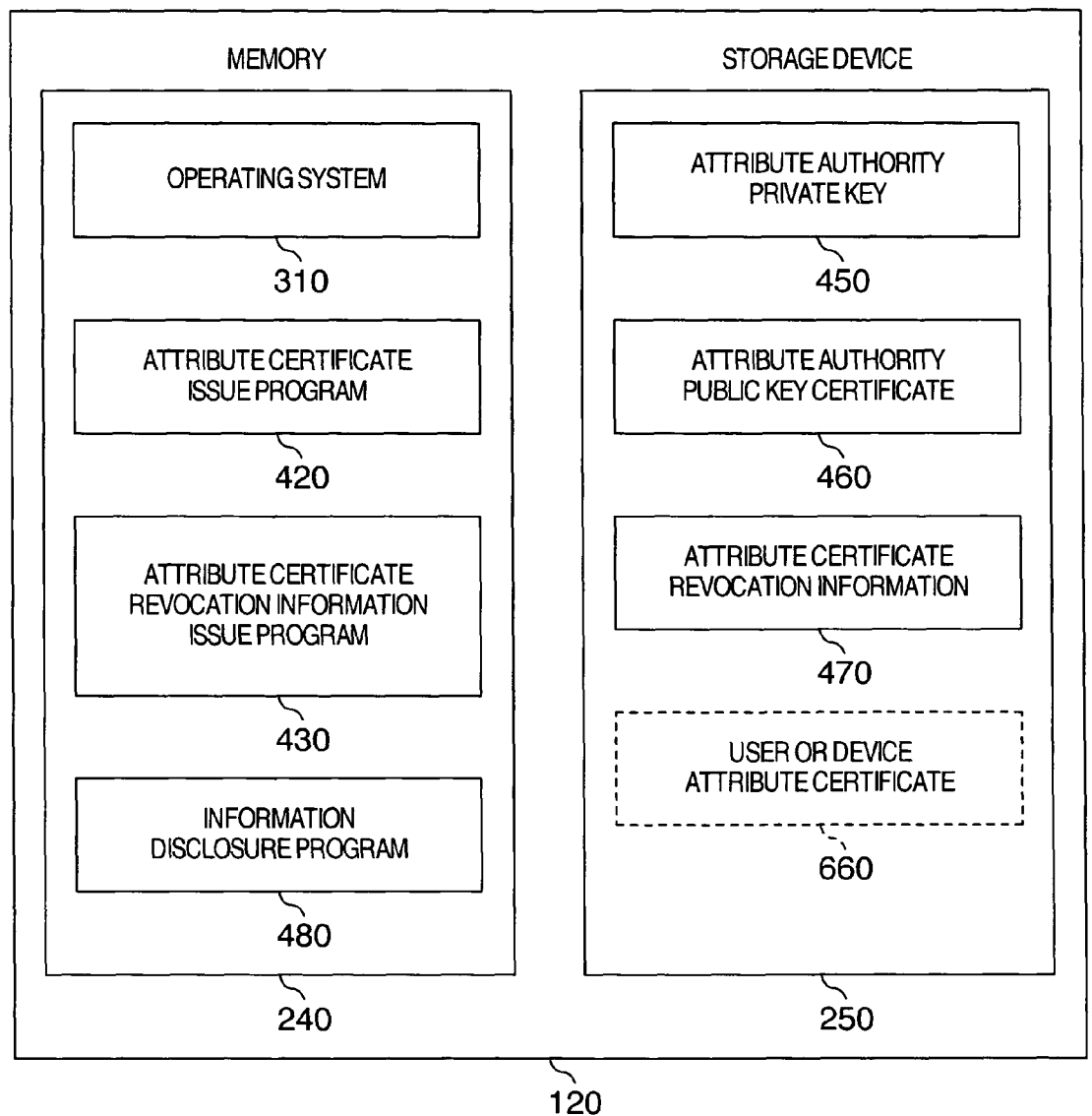
FIG. 4 is a diagram exemplifying a software configuration of an attribute authority device associated with the embodiment.

FIG. 4 shows a software configuration of the attribute authority device 120 associated with the embodiment. In FIG. 4, the memory 240 of the attribute authority device 120 temporarily stores programs including an operating system 310, an attribute certificate issue program 420, an attribute certificate revocation information issue program 430, and an information disclosure program 440. In addition, the storage device 250 of the attribute authority device 120 stores data such as a private key 450 possessed by the attribute authority, a public key certificate 460 corresponding to the private key, and attribute certificate revocation information 470. Also, the storage device 250 stores an attribute certificate 660 of the user or the terminal depending on cases. Incidentally, in the following description, a program or data enclosed by a dotted-line frame in the drawing is not essential, but is possessed according to necessity.

The attribute certificate issue program 420 is a program which links, for a user possessing a public key certificate, public key certificate information of the user with an attribute value of the user to issue an attribute certificate in which a digital signature is made to the linked information using the private key of the attribute authority. Additionally, the attribute certificate revocation information issue program 430 is a program which generates, for the attribute certificate issued from the attribute authority, attribute certificate revocation information 470 in which a digital signature is made using the private key 450 of the attribute authority, in a list of information of revoked attribute certificates. The generated revocation information is stored in the storage device 250.

Moreover, the information disclosure program 480 is a program to disclose, in response to an enquiry from a user, the revocation information 470 in the storage device 260 of the attribute authority device 120. Also, when the storage device 250 of the attribute authority device 120 stores the attribute certificate 660 of the user or the device, the information disclosure program 480 also discloses, in response to an enquiry from a user, the attribute certificate of the corresponding user or device.

The private key 450 of the attribute authority is private key information possessed by the attribute authority and is safely controlled in the attribute authority. Also, the public key certificate 460 of the attribute authority is a public key certificate which is issued from the public key certificate issue program 320 of the certification authority device 110 and which corresponds to the private key 450 possessed by the attribute authority.

Additionally, the attribute certificate revocation information 470 is information which is generated from the attribute certificate revocation information issue program 330 to confirm whether or not the attribute information has been revoked and which corresponds, for example, to an attribute certificate revocation list (ACRL) or the like. Furthermore, the attribute certificate 660 of the user or the device is an attribute certificate which is issued from the attribute certificate issue program 420 of the attribute authority device 120 and which is linked with the public key certificate 380 of the user or the device.

Figure 5:
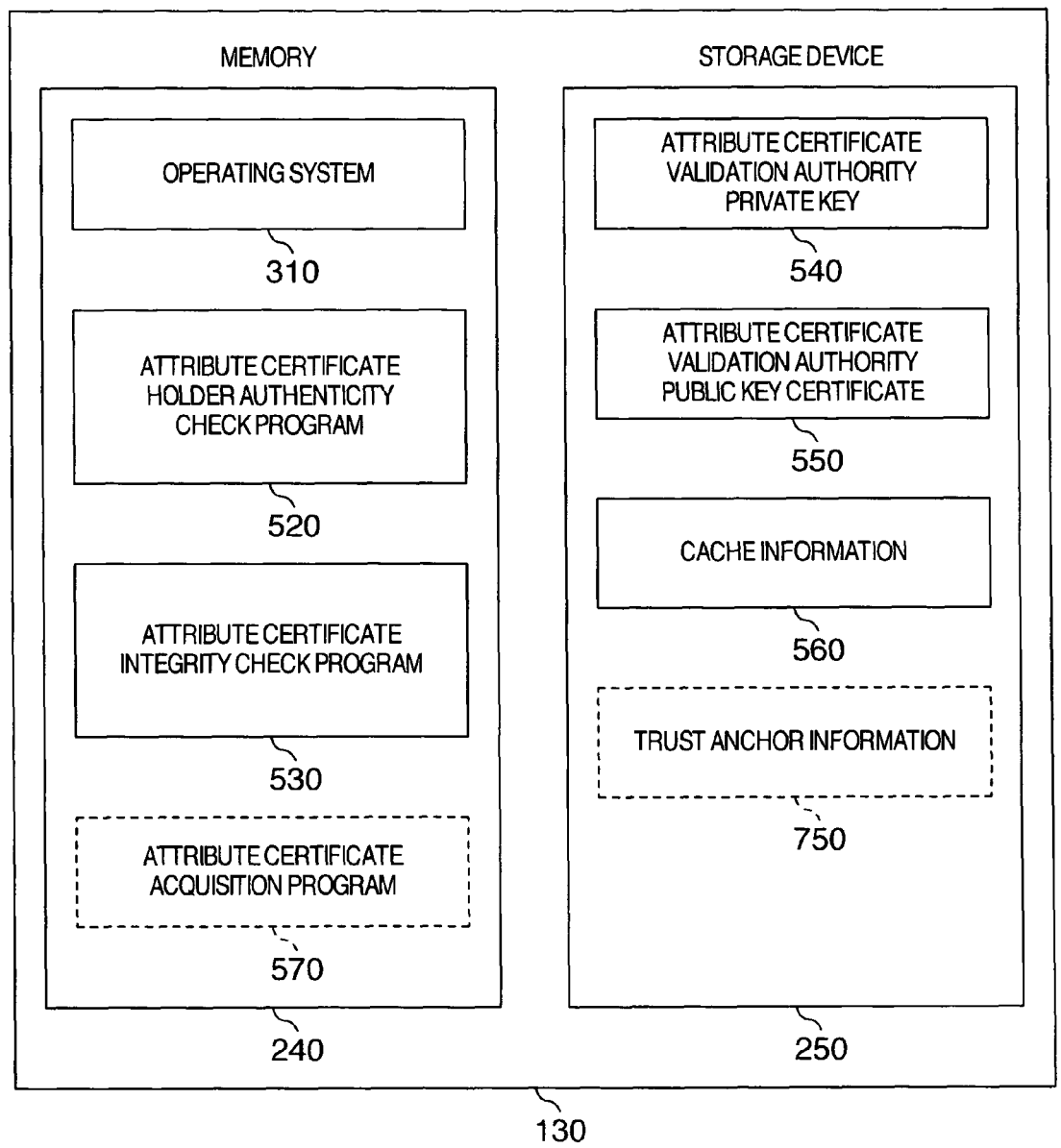
FIG. 5 is a diagram exemplifying a software configuration of an attribute certificate validation device associated with the embodiment.

FIG. 5 shows a software configuration of the attribute certificate validation device 130 associated with the embodiment. In FIG. 5, the memory 240 of the attribute certificate validation device 130 temporarily stores programs including an operating system 310, an attribute certificate holder authenticity check program 520, and an attribute certificate integrity check program 530. Additionally, depending on cases, the memory 240 stores an attribute certificate acquisition program 570. In addition, the storage device 250 of the attribute certificate validation device 130 stores data such as a private key 540 possessed by the attribute certificate validation device 130, a public key certificate 550 corresponding to the private key, and cache information 560. Also, the storage device 250 stores trust anchor information 750 depending on cases. If the anchor information 750 is beforehand stored, the information 750 is a public key certificate of a trusted certification authority set as a management policy of the attribute certificate validation device 130.

The attribute certificate holder authentication check program 520 is a program to make a check to confirm whether or not a person or a device having presented an attribute certificate (the user device 140 in the example of the embodiment) is an authentic subject of the attribute certificate. Specifically, it executes processing in the dotted-line frame (bold-dotted-line frame) on the right-hand side of FIG. 8. The processing of the attribute certificate holder authentication check program corresponds to steps 2011, 2013, 2014, and 2015 in the flow of FIG. 13.

Moreover, the attribute certificate integrity check program 530 is a program to confirm whether or not the contents of the attribute certificate have been guaranteed by an authentic attribute authority. Specifically, it executes processing in a dotted-line frame (a narrow-dotted-line frame) on the left-hand side of FIG. 8. The processing of the integrity check program mainly corresponds to step 2012 in the flow of FIG. 13. The attribute certificate acquisition program 570 is a program which issues, according to the attribute certificate information 670 in the validation request data 1130 sent from the service provider device 150, a request to the attribute authority device 120 for the attribute certificate 660 and which thereby acquires the certificate. The processing of the program corresponds to step 2020 in the flow of FIG. 13.

The private key 540 of the attribute validation authority is private key information possessed by the attribute validation authority and is safely controlled in the attribute validation authority. Also, the public key certificate 550 of the attribute certificate authority is a public key certificate which is issued from the public key certificate issue program 320 of the certification authority device 110 and which corresponds to the private key 540 possessed by the attribute certificate validation authority.

Additionally, the cache information 560 is each certificate and each revocation information used when the attribute certificate integrity is checked or when the attribute certificate holder authenticity is checked, information of a certification path configured by the certificate and the revocation information, a check result obtained for the certification path, or the like and is used for reuse at subsequent checks. Also, the trust anchor information 750 is a public key certificate of a certification authority trusted by a person operating the service provider device 150 or a public key certificate of a trusted certification authority set as a management policy of the attribute certificate validation device 130.

Figure 6:
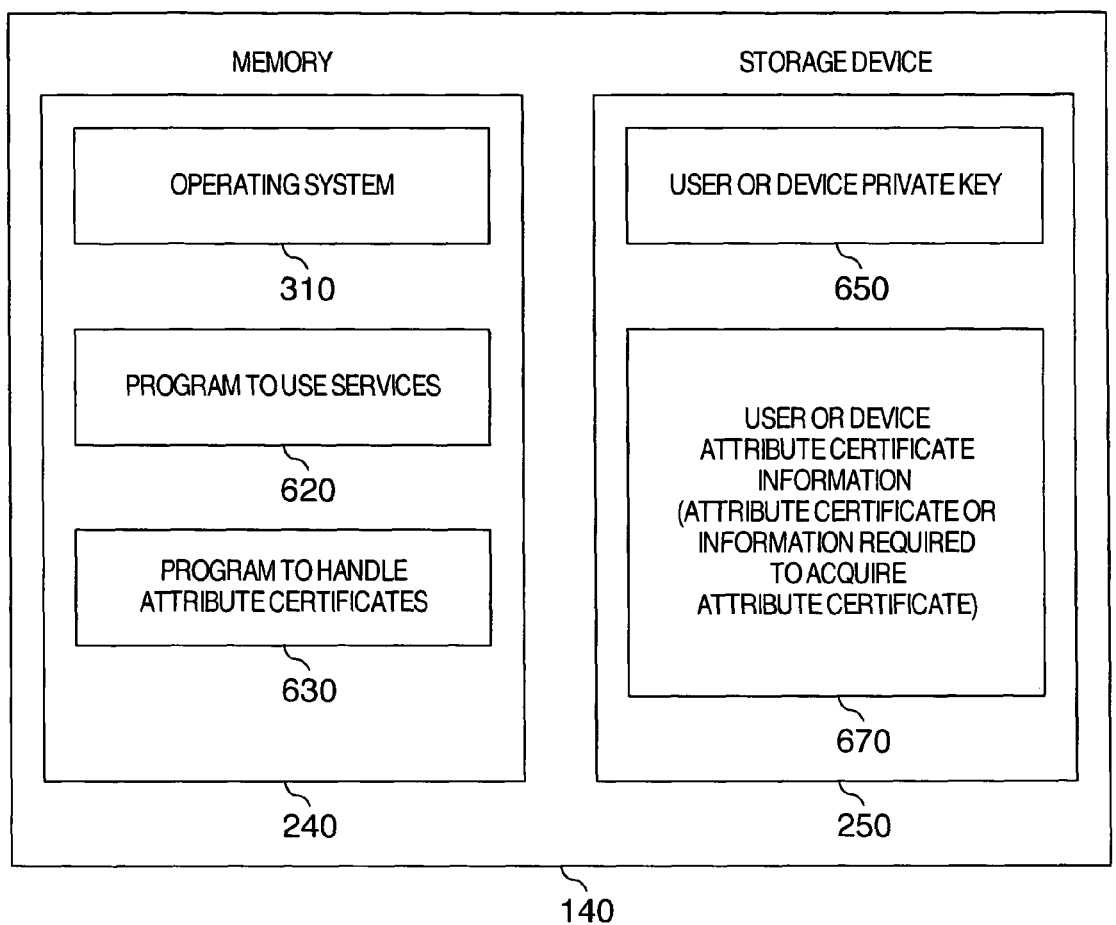
FIG. 6 is a diagram exemplifying a software configuration of a user device associated with the embodiment.

FIG. 6 shows a software configuration of the user device 140 associated with the embodiment. In FIG. 6, the memory 240 of the user device 140 temporarily stores programs such as an operating system 310, a program to use services 620, and a program to handle attribute certificates 630. In addition, the storage device 250 of the user device 140 stores data such as a private key 650 of a person using the user device 140 or the user device itself and attribute certificate information 670 necessary for the attribute certificate validation device to validate an attribute certificate linked with a public key certificate corresponding to the private key 650. The attribute certificate information corresponds to the attribute certificate 660 of the user or the device or information required to acquire the attribute certificate 660.

The program to use services 620 is a program necessary to use services provided by the service provider device 150 on the network 160. When the device 150 provides Web services, the program 620 corresponds to a Web browser or the like. Processing of the program corresponds to steps 2001, 2004, 2006, and 2019 in the flow of FIG. 13. The program to handle attribute certificates 630 is a program to generate signed data required to present a qualification to the service provider device 150. Processing of the program 630 corresponds to step 2005 in the flow of FIG. 13.

The private key 650 of the user or the device is private key information possessed by the user or controlled by the user device 140 itself and is safely controlled in the user device 140. Additionally, the attribute certificate information 670 is information necessary for the attribute certificate validation device to validate the attribute certificate of the user or the device. The attribute certificate information 670 is an attribute certificate 660 which is issued from the attribute certificate issue program 420 of the attribute authority device 120 and which is linked with the public key certificate 380 of the user or the device or information required to acquire the attribute certificate 660, and the information 670 corresponds to, for example, an address of the attribute authority device 120 on the network and a combination of an issuer name and an attribute certificate serial number of an attribute certificate shown in FIG. 9.

Figure 7:
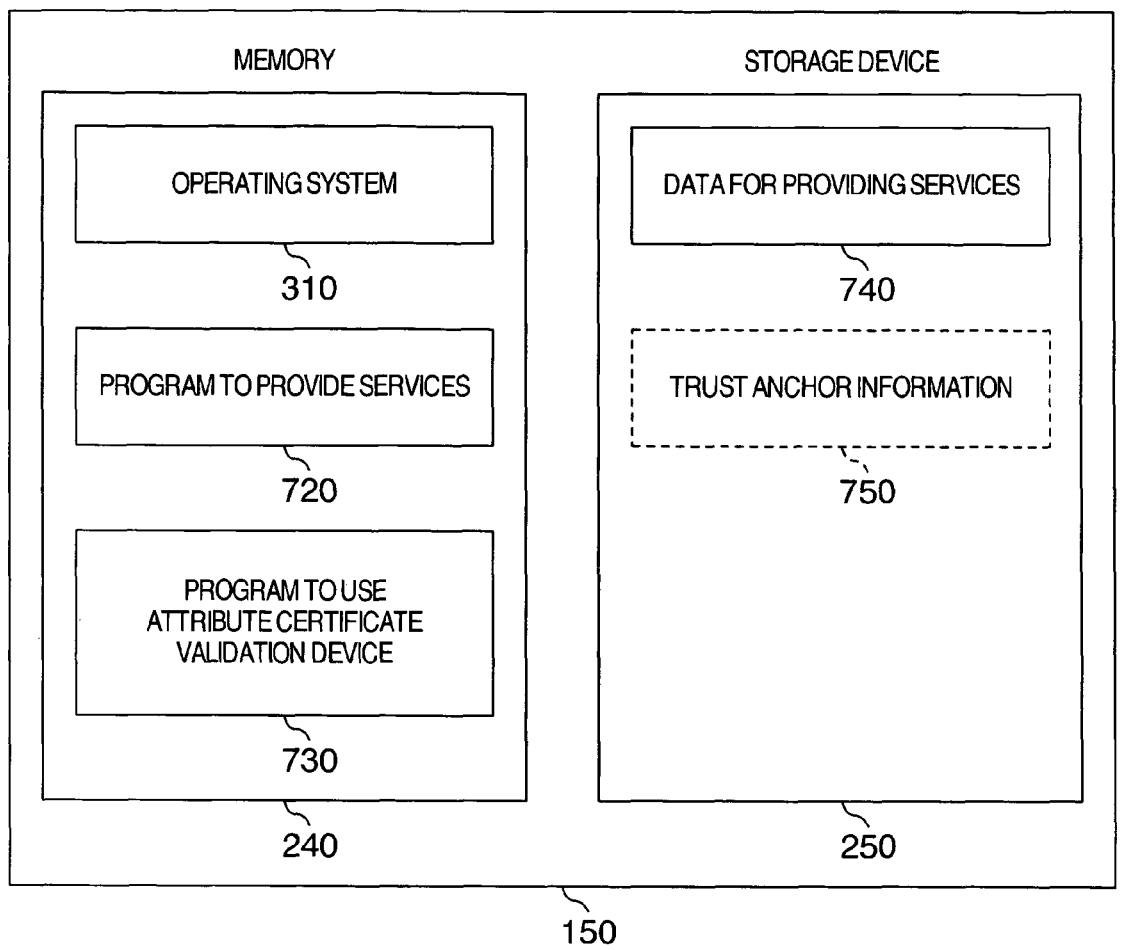
FIG. 7 is a diagram exemplifying a software configuration of a service provider device associated with the embodiment.

FIG. 7 shows a software configuration of the service provider device 150 associated with the embodiment. In FIG. 7, the memory 240 of the service provider device 150 temporarily stores programs such as an operating system 310, a program to provide services 720, and a program to use attribute certificate validation device 730. In addition, the storage device 250 of the service provider device 150 stores data such as a data group 740 required to provide services. Also, the storage device 250 stores the trust anchor information 750 depending on cases.

The program to provide services 720 is a program necessary to provide services which the service provider device 150 provides on the network 160. The program 720 corresponds to a Web server program or the like. Processing of the program 720 corresponds to steps 2002, 2003, 2007, and 2018 in the flow of FIG. 13. The program to use attribute certificate validation device 730 is a program which requests the attribute certificate validation device 130 to check a person having presented a qualification and which receives and analyzes a result thereof. Processing of the program 730 corresponds to steps 2009, 2010, 2016, and 2017 in the flow of FIG. 13.

The data for providing services 740 is a data group to be used by the program to provide services, and corresponds to, for example, a Hypertext Markup Language (HTML) file and a database file necessary for services if the program to provide services is a Web server program. If the trust anchor information 750 is stored, the information 750 is a public key certificate of a certification authority trusted by a person operating the service provider device 150.

Figure 8:
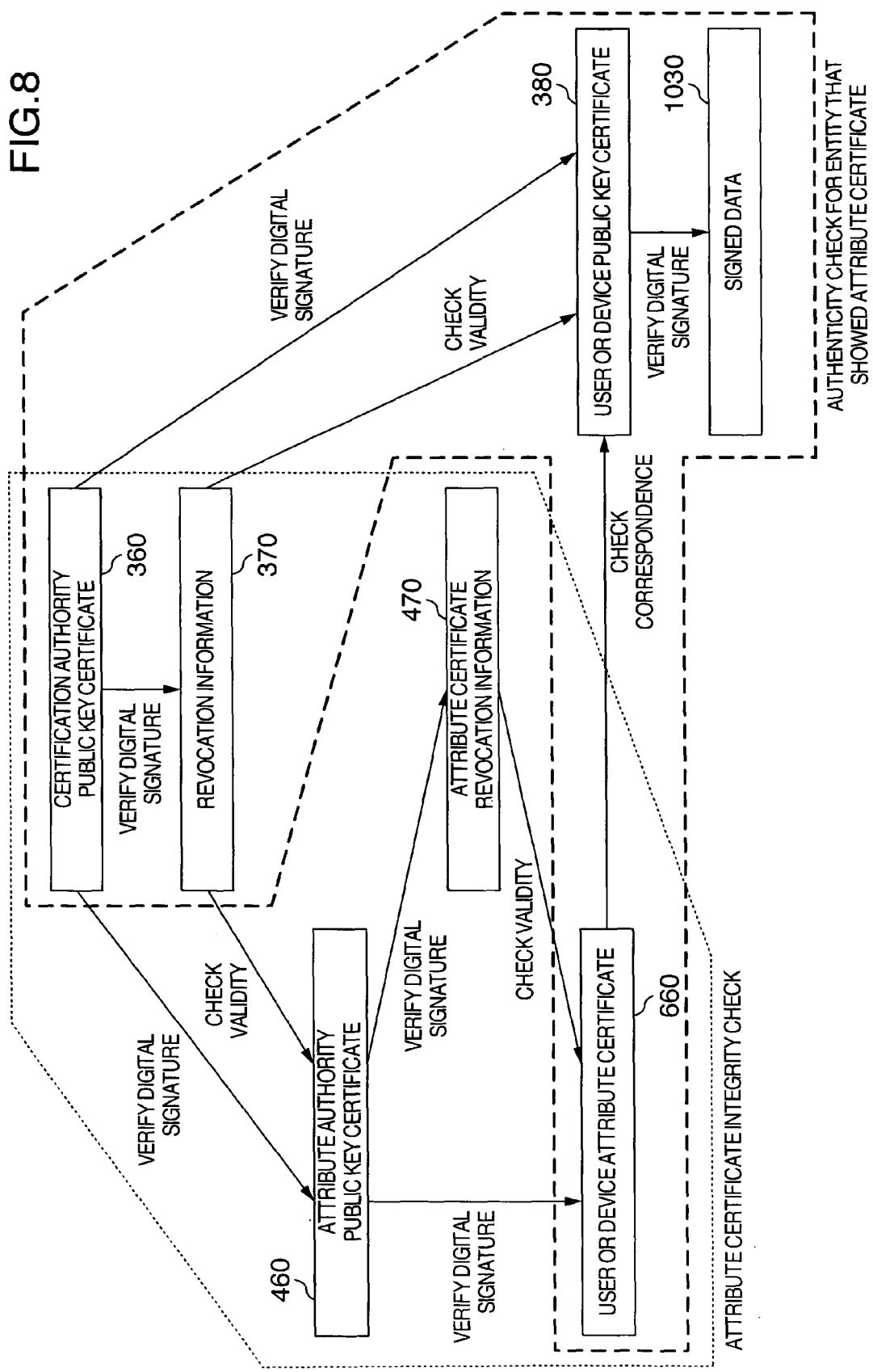
FIG. 8 is a diagram exemplifying a certification path in a system to which an attribute certificate validation device according to an embodiment of the present invention is applied.

FIG. 8 is a diagram showing a configuration of a certification path in a system using the attribute certificate validation device according to the embodiment of the present invention. The highest root of the certification path is a public key certificate 360 of the certification authority. In the diagram, the certification path is a hierarchic route for the public key certificate from the certification authority to the user or the device. As data signed by a private key 350 (a private key of the certification authority itself) corresponding to the public key certificate, there exist a public key certificate 460 of an attribute authority, a public key certificate 380 of the user or the device, and revocation information 370. Moreover, as data signed by a private key 450 (a private key of the attribute authority itself) corresponding to the public key certificate 460 of an attribute authority, there exist an attribute certificate 660 of the user or the device and attribute certificate revocation information 470. Also, as data signed by a private key 650 (a private key of the user or the device itself) corresponding to the public key certificate 380 of the user or the device, there exists signed data 1030.

For the validation of an attribute certificate, it is required to conduct both validations including a check of attribute integrity and a check of authenticity of a person or a device having presented the attribute certificate. The check of attribute integrity is processing in which a certification path from the public key certificate 360 of the certification authority to the attribute certificate 660 of the user or the device is constructed and is verified to check validity of each certificate, and is implemented by the attribute certificate integrity check program 520 (reference is to be made to a narrow-dotted-line frame on the left-hand side of FIG. 8).

Figure 10:
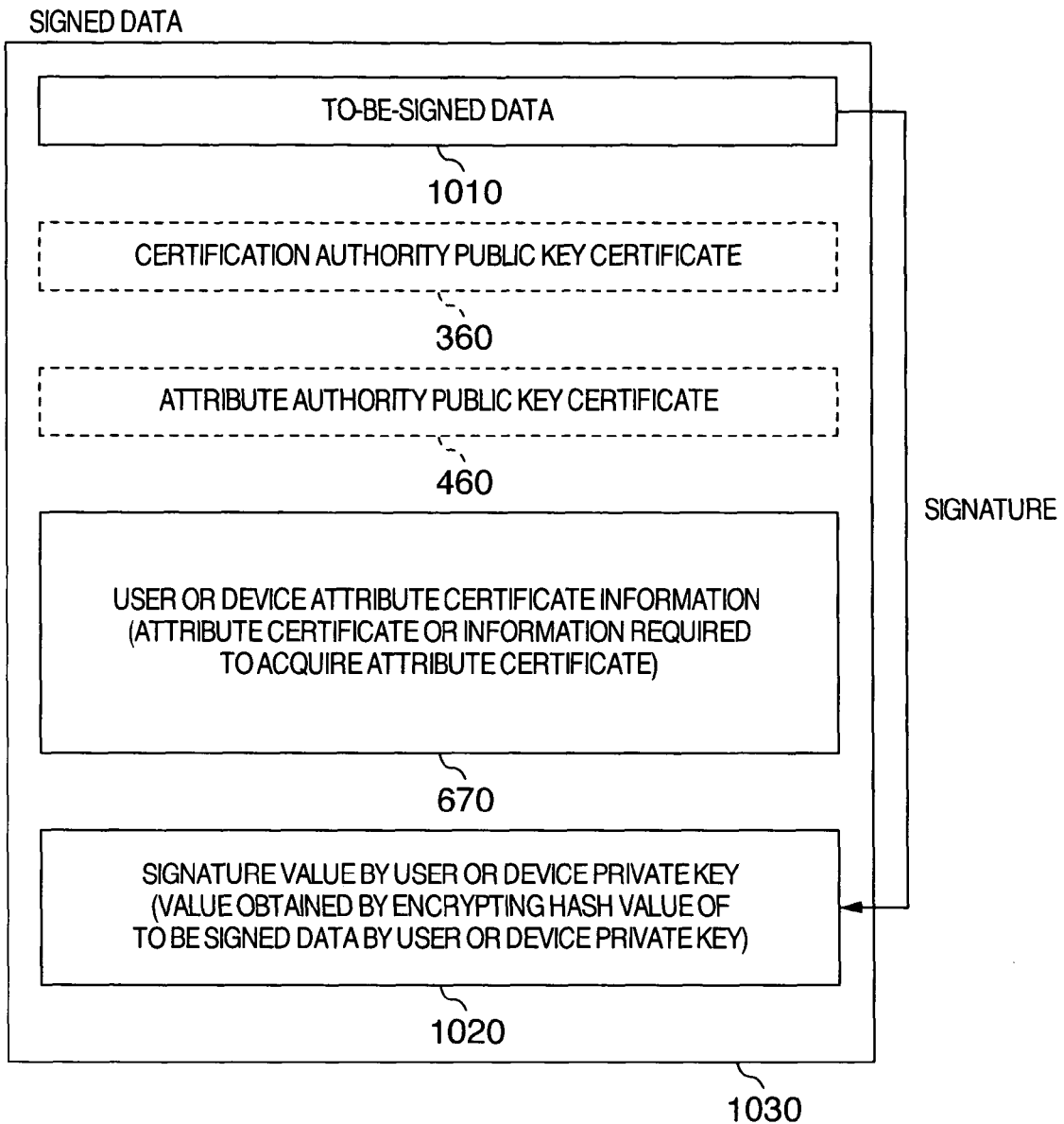
FIG. 10 is a diagram exemplifying a data specification of the signed data in the embodiment.
Figure 11:
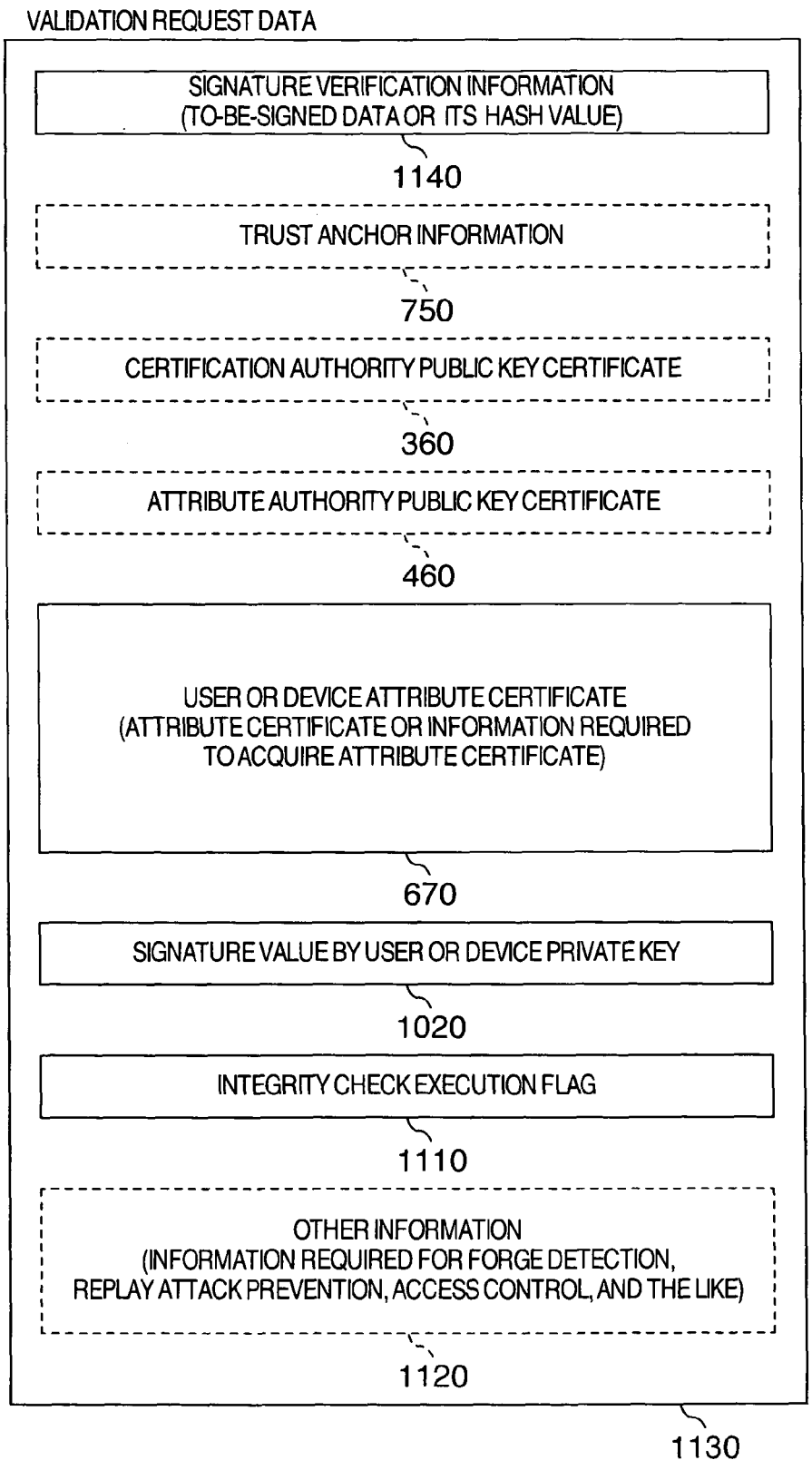
FIG. 11 is a diagram exemplifying a data specification of the validation request data in the embodiment.

The processing is similar to that of the conventional method; specifically, when the attribute certificate 660 of the user or the device is supplied as an input, the public key certificate 460 of an attribute authority as a certificate at a level higher than that of the attribute certificate 660 is acquired from, for example, the signed data 1030 (reference is to be made to FIG. 10) or validation request data 1130 (reference is to be made to FIG. 11). Next, the public key certificate 360 of the certification authority at a level higher than that of the public key certificate 460 of an attribute authority is acquired from, for example, the signed data or the validation request data 1130. Subsequently, a check is made to confirm that the public key certificate 360 of the certification authority matches with the trust anchor information 750 (reference is to be made to FIG. 5). Furthermore, the signature of the attribute authority assigned to the attribute certificate 660 of the user or the device is verified using the public key certificate 460 of the attribute authority. Also, the signature of the attribute authority assigned to the public key certificate 460 of the attribute authority is verified using the public key certificate 360 of the certification authority.

Moreover, to confirm whether or not the attribute certificate 660 of the user or the device has been revoked, the attribute certificate revocation information 470 opened to the public by an attribute certificate revocation information disclosure program 440 of the attribute authority device 120 is acquired. Thereafter, the signature of the attribute authority assigned to the revocation information 470 is verified using the public key certificate 460 of the attribute authority. Furthermore, using revocation information described in the revocation information 470, a check is made to confirm that the attribute certificate 660 of the user or the device is valid.

Similarly, to confirm whether or not the public key certificate 460 of the attribute authority has been revoked, the revocation information 370 opened to the public by the revocation information disclosure program 340 of the certification authority device 110 is acquired. Thereafter, the signature of the certification authority assigned to the information 370 is verified using the public key certificate 360 of the certification authority. Furthermore, using revocation information described in the information 370, a check is made to confirm that the public key certificate 460 of the attribute authority is valid. When the processing above has been successfully terminated, it is determined that the contents of the attribute certificate are valid; otherwise, it is determined that the contents are not valid.

The check of authenticity of a person or a device having presented an attribute certificate is processing including verification of the signature of the signed data 1030 generated by the person or the device having presented the attribute certificate, construction and verification of a certification path from the public key certificate 360 of the certification authority to the public key certificate 380 of the user or the device, and a check of validity of each certificate, and the processing is implemented by the attribute certificate holder authenticity check program 520. In the processing, specifically, when the attribute certificate 660 of the user or the device is supplied as an input, there is acquired a pointer (a combination of the public key certificate serial number and the public key certificate issuer name shown in FIG. 9, which will be described later) to the public key certificate 380 of the user or the device described in the attribute certificate.

Next, using the acquired information, the public key certificate 380 of the user or the device opened to the public by the information disclosure program 340 of the certification authority device 110 is acquired. At acquisition of the public key certificate, the validation is conducted in a method with higher safety, for example, the SSL client validation is conducted. Next, the public key certificate 360 of the certification authority having a level higher than that of the acquired public key certificate 380 of the user or the device is acquired from the validation request data 1130 or the like. Subsequently, a check is made to confirm that the public key certificate 360 of the certification authority matches with the trust anchor information 750 contained in the validation request data.

In addition, to confirm whether or not the signature of the user or the device attached to the signed data 1030 has been assigned by a private key corresponding to the public key certificate 380 of the user or the device, the signature is verified using the data to be signed (hereinafter, expressed as "to-be-signed data") 1010 contained in the validation request data or a hash value thereof, the signature value 1020 by the private key of the user or the device, and the public key certificate 380 of the user or the device. Thereafter, the signature of the user of the device assigned to the public key certificate 380 of the user or the device is verified using the public key certificate 360 of the certification authority.

Additionally, to confirm whether or not the public key certificate 380 of the user or the device has been revoked, the revocation information 370 opened to the public by the information disclosure program 340 of the certification authority device 110 is acquired. Thereafter, the signature of the certification authority assigned to the information 370 is verified using the public key certificate 360 of the certification authority. Furthermore, using revocation information described in the information 370, a check is made to confirm that the public key certificate 380 of the user or the device is valid. When the processing above has been successfully terminated, it is determined that the holder of the attribute certificate is authentic; otherwise, it is determined that the holder of the attribute certificate is not authentic.

Figure 9:
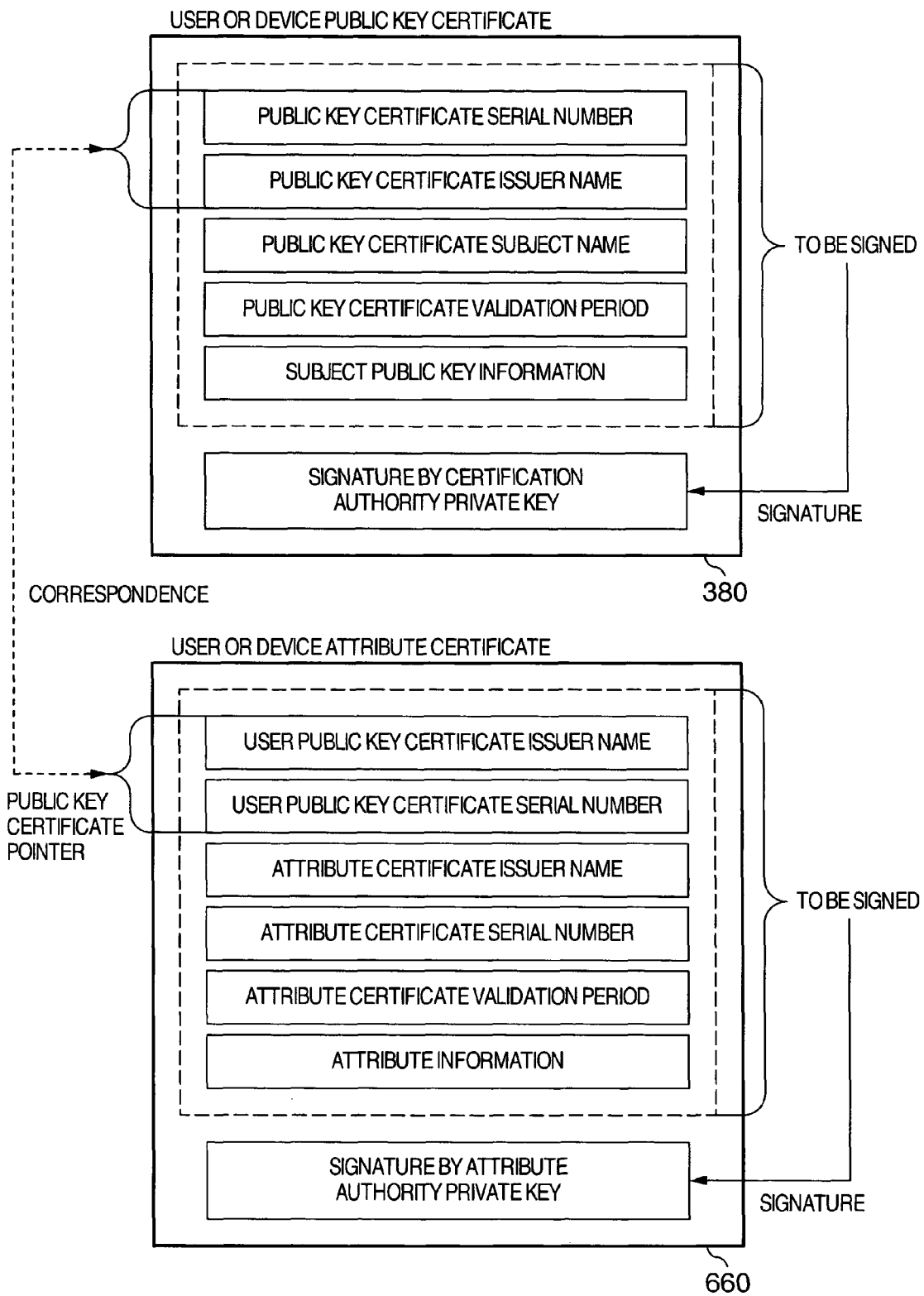
FIG. 9 is a diagram exemplifying a data specification for the public key certificate and the attribute certificate of the user or the device employed in the embodiment.

FIG. 9 is a diagram showing a data specification of the public key certificate 380 of the user or the device and the attribute certificate 660 used in the embodiment. The public key certificate 380 of the user or the device conforms to the specification of the prior art. Specifically, it is data assigned with a digital signature by the private key 350 of the certification authority in which the items such as the public key certificate serial number, the public key certificate issuer name, the public key certificate subject name, the public key certificate validity period, and the public key certificate information are to be signed. In general, the combination of the public key certificate serial number and the public key certificate issuer uniquely identifies the public key certificate, and the combination is used as a pointer of the public key certificate.

Furthermore, it is assumed that privacy information identifying an individual, for example, a name of the subject of the certificate or an identification number of a device or a unit is described in the public key certificate subject name (a name field of the owner of a public key certificate is referred to as subject in the certificate, and hence information such as a name identifying an individual is used as a synonym of "subject"). Incidentally, the method in which a qualification or a privilege is verified without notifying information of the subject of the public key certificate from the user device 140 to the service provider device 150 is one of the features of the embodiment.

The attribute certificate 660 of the user or the device also conforms to the specification of the prior art. Specifically, it is data assigned with a digital signature by the private key 450 of the certification authority in which the items such as the user's public key certificate issuer name, the user's public key certificate serial number, the attribute certificate issuer name, the attribute certificate validity period, and the attribute information are to be signed. The user's public key certificate issuer name and the user's public key certificate serial number are set to match with the public key certificate serial number and the public key certificate issuer.

Figure 12:
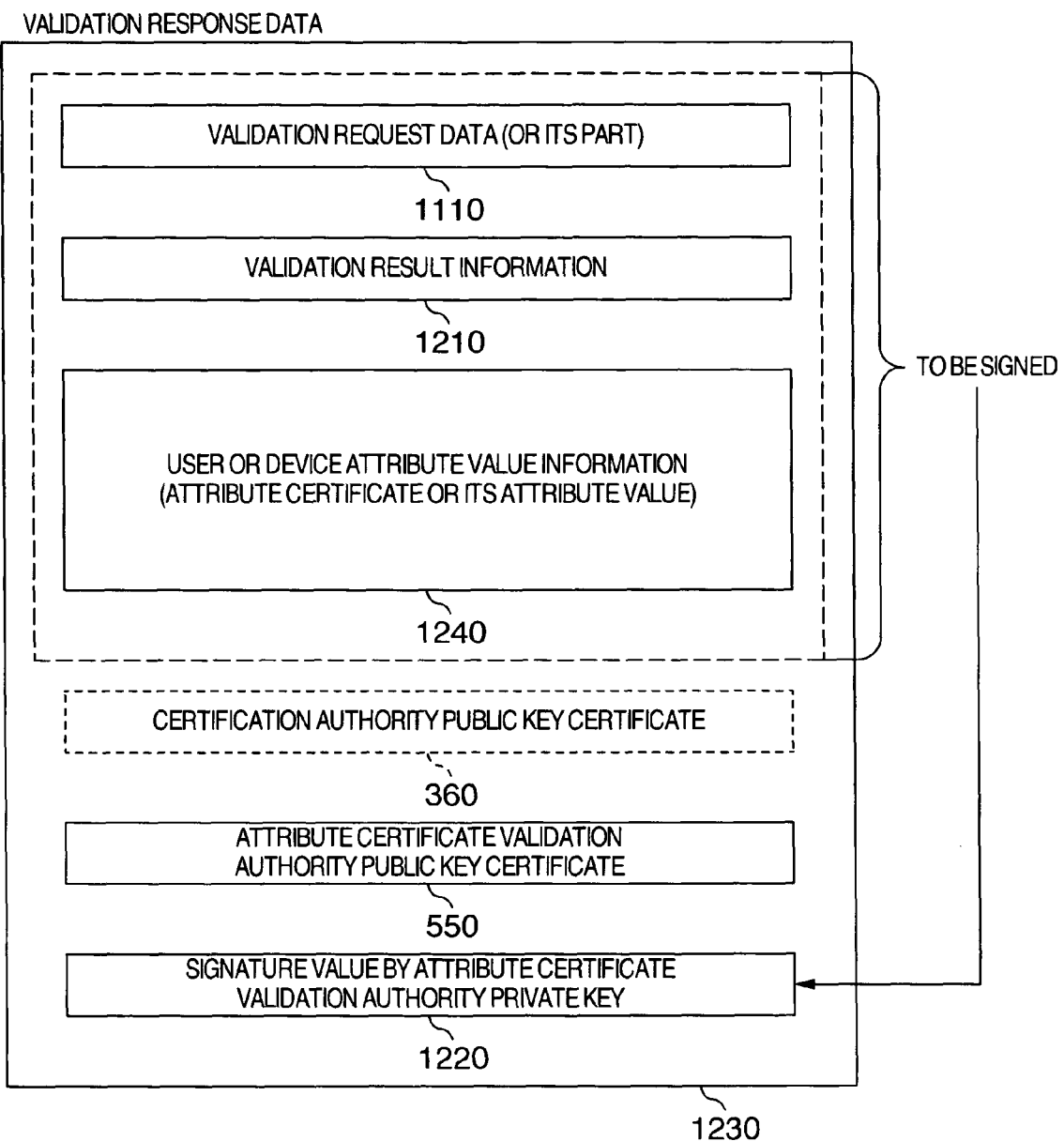
FIG. 12 is a diagram exemplifying a data specification of the validation response data in the embodiment.

Next, FIGS. 10 to 12 show data specifications used in the embodiment. FIG. 10 is a diagram showing a data specification of the signed data 1030 in the embodiment (showing a specification of signed data generated by the user device 140 at reception of a signature request by the service provider device 150).

In FIG. 10, the signed data 1030 is data including to-be-signed data 1010, a public key certificate 360 of a certification authority, a public key certificate 460 of an attribute authority, attribute certificate information 670 of the user or the device, and a signature value 1020 signed for the to-be-signed data 1010 by the private key 650 of the user or the device. The to-be-signed data 1010 is data required for qualification certification (may be data required for a transaction) or data such as a random number.

Furthermore, it is also possible that the signed data 1030 does not include the public key certificate 360 of a certification authority and the public key certificate 460 of an attribute authority. Also, when the storage device 250 of the attribute authority device 120 stores the attribute certificate 660 of the user or the device, the signed data 1030 may include the attribute certificate 660 of the user or the device as the attribute certificate information 670. When the storage device 250 of the attribute authority device 120 does store the attribute certificate 660 of the user or the device, it is required that the signed data 1030 includes, as the attribute certificate information 670, information required to acquire the attribute certificate 660. Additionally, the signed data is generated by the user device 140 in step 2005 of FIG. 13. In this connection, that the signed data 1030 does not include the public key certificate 380 of the user shown in FIG. 9 (particularly, the subject as privacy information contained in the public key certificate) is one of the features of the embodiment.

FIG. 11 is a diagram showing a data specification of the validation request data 1130 in the embodiment (data generated by the service provider device 150 at reception of the signed data 1030 from the user device 140 to request the validation to the attribute certificate validation device 130). The validation request data 1130 is data including signature verification information 1140 which can be calculated from the to-be-signed data 1010 in the signed data 1030 and which is required for the attribute certificate validation device 130 to validate the signature value 1020, attribute certificate information 670 of the user or the device, and a signature value 1020 by a private key of the user or the device. Moreover, when the service provider device 150 keeps therein the trust anchor information 750, the validation request data 1130 may include the trust anchor information. In addition, the validation request data 1130 may include a public key certificate 360 of the certification authority, a public key certificate 460 of the attribute authority, an integrity check execution flag 1110, and information 1120 required for forge detection, replay attack prevention, access control, and the like (as an option).

The signature verification information 1140 corresponds to the to-be-signed data 1010 or a hash value thereof. However, if privacy leakage results when the data itself of the to-be-signed data 1010 is transmitted to the attribute certificate validation device, the hash value of the to-be-signed data 1010 is stored as the signature verification information. For the attribute certificate information 670 of the user or the device, only when the integrity check execution flag 1110 is set to false, the pointer of the public key certificate corresponding to the attribute certificate may be stored in place of the attribute certificate. Also, when the attribute certificate information 670 of the signed data received from the user device does not contain the attribute certificate 660, but contains the information required to acquire the attribute certificate 660, the signed data 1030 contains the required information, not the pointer of the attribute certificate 660 of the user or the device or the public key certificate corresponding to the attribute certificate.

The integrity check execution flag 1110 is a flag to designate whether or not the attribute certificate validation device 130 conducts the attribute certificate integrity check (a flag to designate that the integrity evaluation is conducted by the service provider device 150 or the attribute certificate validation device 130). When the attribute certificate integrity check program 520 is installed in the user device 140, the integrity execution flag 1110 may be set to false. Otherwise, it is required to set the flag to true.

Other information 1120 is information to detect forge, information to prevent replay attack, and information required for access control, and corresponds to, for example, a signature value by the private key when the service provider device 150 possesses the private key or random number information to establish a correspondence between the validation request data 1130 and the validation response data 1230. Moreover, it is also possible that the validation request data 1130 does not include the public key certificate 360 of the attribute authority, the public key certificate 460 of the attribute authority, and the other information 1120. The validation request data is generated by the service provider device 150 in step 2009 of FIG. 13.

FIG. 12 is a diagram showing a data specification of the validation response data 1230 in the embodiment. The data 1230 is data including validation request data 1110 or part thereof, validation result information 1210, a public key certificate 550 of an attribute certificate validation authority, the validation request data 1110 or part thereof, the validation result information 1210, and a signature value 1220 signed by a private key 540 of the attribute certificate validation authority as a to be signed item.

Furthermore, as the attribute certificate information 670 in the validation request data 1130 received by the attribute certificate validation device 130, if the information required to acquire an attribute certificate is contained in place of the attribute certificate 660, the attribute value information 1240 including an attribute value described in the attribute certificate 660 of the user or the device is included in the range of to-be-signed data of the validation response data 1230. Additionally, the validation response data 1230 may include the public key certificate 360 of the certification authority as an option. As for the validation request data 1110, if the validation response data 1230 is quite large in size, the data 1110 itself is not stored, but it is also possible to store only necessary and minimum information indicating the certificate and the signature which have been verified.

Moreover, the validation result information 1210 is information to indicate whether or not information designated by the validation request data has been correctly verified. In addition, it is also possible that the validation request data 1130 does not include the public key certificate 360 of the certification authority. Also, when the attribute certificate information 670 in the validation request data 1130 does not include the attribute certificate 660 of the user or the device or the pointer of the public key certificate described in the attribute certificate, it is required that the validation response data 1230 corresponding to the validation request data includes the attribute information 1240. The validation response data is generated by the attribute certificate validation device 130 according to the embodiment in step 2014 of FIG. 13. Incidentally, the service provider device (verifier) 150 receives the validation response data 1230 and decodes the validation result information 1210 using the public key certificate 550 of the attribute certificate validation authority in the data 1230 (reference is made to S2017 of FIG. 13).

Figure 13:
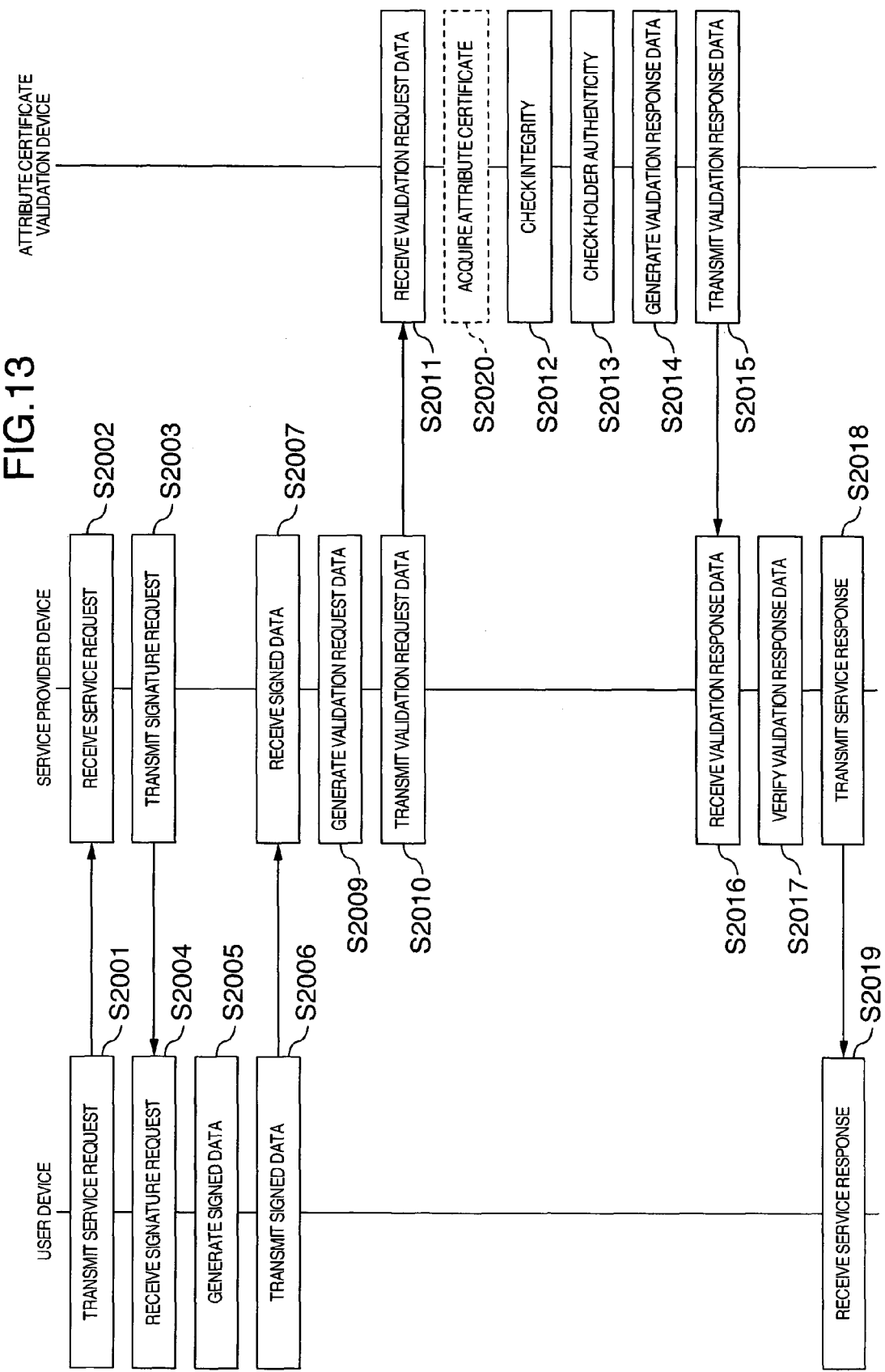
FIG. 13 is a diagram exemplifying a flow of a qualification verification method using an attribute certificate validation device according to an embodiment of the present invention.

FIG. 13 is a diagram showing a flow of a quality validation method using the attribute certificate validation device according to the embodiment of the present invention. Description will be given of a procedure for the service provider device 150 to conduct qualification verification for the user device 140 between the user device 140, the service provider device 150, and the attribute certificate validation device 130.

In FIG. 13, the user device 140 first activates the program to use services 620 to transmit a request to receive a service, i.e., a service request to the service provider device 150 (step 2001). The service provider device 150 receives by the program to provide services 720 the service request transmitted from the user device 140 (step 2002). Having received the service request in the step, the program to provide services 720 transmits a request for signed data required to verify a qualification, namely, a signature request to the user device 140. In consideration of replay attack at validation, the service provider device 150 generates a random number and stores the random number in the storage device 250, and the service provider device may transmit information including the random number to the user device 140 (step 2003).

The user device 140 receives by the program to use services 620 the signature request transmitted from the service provider device 150 (step 2004). Having received the signature request in the step, the program to use services 620 requests the program to handle attribute certificates 630 to generate signed data 1030. The program 630 generates the signed data 1030 according to the data specification of FIG. 10. The to-be-signed data 1010 is data which is required for or associated with qualification verification and which is generated by the program to use services. The data may be a random number generated in step 2003. Moreover, each certificate is acquired from the storage 20 in the pertinent device.

Additionally, when the storage device 250 of the attribute authority device 120 stores the attribute certificate 660 of the user or the device, the signed data 1030 may include, as the attribute certificate information 670, the information required to acquire the attribute certificate 660 in place of the attribute certificate 660 of the user or the device. The signature value is generated using the private key of the user or the device with the to-be-signed data 1010 contained in the range of to-be-signed data (step 2005). Having generated the signed data 1030 in the step, the program to use services 620 transmits the signed data 1030 to the service provider device 150 (step 2006).

The service provider device 150 receives by the program to provide services 720 the signed data 1030 transmitted from the user device 140 (the signed data 1030 thus received does not include the public key certificate of the user device, and hence the subject which is privacy information of the user device is not described). In the situation, if a random number is generated in step 2003 and the to-be-signed data 1010 includes the random number in step 2005, a check is made to confirm that the random number matches with that having recorded in the service provider device. If the random numbers do not match with each other, it is assumed that replay attack has been conducted and hence the access of the user device 140 is rejected (step 2007).

Subsequently, the service provider device 150 generates by the program to use attribute certificate validation device 730 the validation request data 1130 to be sent to the attribute certificate validation device 130. A specific method of generating the validation request data has been described in the description of FIG. 11. If information stored in the service provider device 150 is used as the trust anchor information 750, it is required that the validation request data 1130 includes the trust anchor information 750. If information having stored in the attribute certificate validation device 130 is used as the trust anchor information 750, it is not required that the validation request data 1130 includes the trust anchor information.

Additionally, as the attribute certificate information 670 of the validation request data 1130, the attribute certificate information 670 itself in the signed data 1030 received in step 2007 is included in the validation request data. The integrity check execution flag 1110 in the validation request data 1130 is set to false (step 2009). Having generated the validation request data 1130 in the step, the program to use attribute certificate validation device 730 transmits the data 1130 to the attribute certificate validation device 130 (step 2010)

The validation device 130 receives the validation request data 1130 transmitted from the service provider device 150 (step 2011). After the data 1130 is received in the step, if the attribute certificate information 670 in the validation request data 1130 includes the information required to acquire the attribute certificate 660 of the user or the device, the validation device 130 acquires, by the attribute certificate acquisition program 570 according to the information, the attribute certificate 660 as the validation item from the attribute authority device 120. If the validation request data 1130 does not include the information required to acquire the attribute certificate 660, this step is skipped (step 2020).

Subsequently, assuming that the attribute certificate 660 contained in the validation request data 1130 received in step 2011 or the attribute certificate 660 acquired from the attribute authority device 120 in step 2020 is to be validated, and the trust anchor information 750 contained in the validation request data received in step 2011 or the trust anchor information 750 stored in the storage device 250 of the attribute certificate validation device 130 is a trust anchor, the validation device 130 executes by the attribute certificate integrity check program 530 the processing enclosed as the attribute certificate integrity check shown in FIG. 8 (processing in the narrow-dotted-line frame shown in FIG. 8). A specific processing has been described in the description of FIG. 8. In the step, to collect information required for the check, there occurs communication with the certification authority device 110 and the attribute authority device 120. However, since the description has been given in the description of FIG. 8 and the operation can be carried out in the prior art, a specific processing procedure in this step will not be described (step 2012).

Next, for the attribute certificate 660 to be validated in step 2012, the signature verification information 1140, and the signature value 1020 by a private key of the user or the device, the processing enclosed as the attribute certificate holder authenticity check shown in FIG. 8 (processing in the bold-dotted-line frame shown in FIG. 8) is executed by the attribute certificate holder authenticity check program 520. A specific processing has been described in the description of FIG. 8. In the step, to collect information required for the check, there also occurs communication with the certification authority device 110. However, since the description has been given in the description of FIG. 8 and the operation can be carried out in the prior art, a specific processing procedure in this step will not be described (step 2013).

Next, the attribute certificate validation device 130 generates the validation response data 1230 to be sent to the service provider device 150 (the signed data transmitted to the device 150 and the validation request data transmitted to the attribute certificate validation device do not contain the public key certificate of the user device. However, on the premise that the public key certificate of the user device can be obtained from the certification authority device, the attribute certificate validation device generates data (not including the public key certificate of the user device) replying only a result about validity of the user device possessing predetermined attribute information). A specific method of generating the validation response data has been described in the description of FIG. 12. The validation result information 1210 in the validation response data 1230 stores a result of the validation in steps 2012 and 2013. When the validation request data 1130 received in step 2011 includes the information 670 required to acquire the attribute certificate 660 of the user of the device, the validation response data 1230 includes the attribute certificate 660 of the user of the device acquired in step 2020 or the attribute information 1240 which is described in the attribute certificate 660 and which is obtained by conducting analysis and extraction for the attribute certificate 660.

Also, for the validation response data, a digital signature is made by the private key 540 of the attribute certificate authority to prevent forge and to certify the generator (step 2014). Having generated the validation response data 1230 in the step, the attribute certificate validation device 130 transmits the validation response data 1230 to the service provider device 150 (step 2015).

The service provider device 150 receives by the program to use attribute certificate validation device 730 the validation response data 1230 transmitted from the attribute certificate validation device 130 (step 2016). Having received the data 1230 in the step, the device 150 makes a check to confirm that the signature value of the attribute certificate authority assigned to the data can be verified by the public key certificate 550 of the attribute certificate authority contained in the data. Also, the device 150 makes a check to confirm that the signature assigned to the public key certificate can be verified by the public key certificate 360 of the certification authority, the certificate 360 having a level higher than that of the public key certificate to be verified. Furthermore, the device 150 makes a check to confirm that the public key certificate 360 of the certification authority matches with the trust anchor information 750 in the service provider device 150 (step 2017).

If the validation processing has been successfully terminated in steps 2012, 2013, and 2017, it is assumed that the attribute certificate has been successfully validated, and then a check is made, if the attribute certificate information 670 in the signed data 1030 received in step 2007 is the attribute certificate 660, to confirm whether or not there exists a qualification to use services provided by the service provider device 150, on the basis of the attribute certificate 660. Otherwise, whether or not there exists a qualification to use services provided by the service provider device 150 is confirmed on the basis of the attribute value information 1240 contained in the validation response data 1230 received in step 2016.

If it is confirmed as a result of the qualification check that there exists a qualification to user services, the program to provide services 720 transmits a correct service response to the user device 140. Otherwise, the program 720 transmits to the user device 140 a service response indicating that services cannot be used (step 2018). The user device 140 receives by the program to use services 620 the service response transmitted from the service provider device 150 (step 2019). Through the procedure, the qualification check of the user device 140 by the service provider device 150 can be conducted while securing the conventional safety, protecting also privacy.

Figure 14:
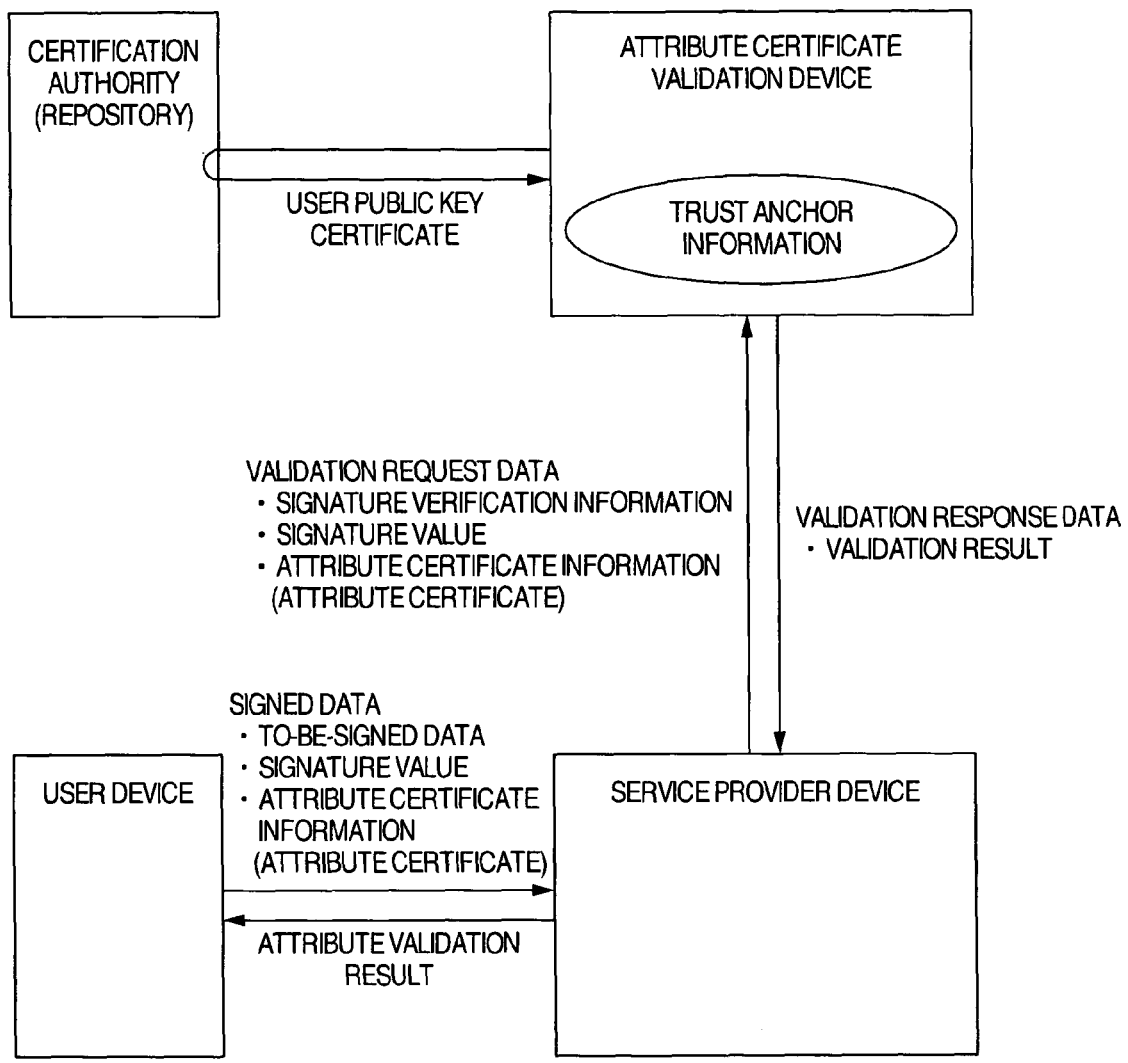
FIG. 14 is a diagram exemplifying a mode of qualification verification using an attribute certificate validation device according to an embodiment of the present invention.

Next, referring to FIGS. 14 to 16, description will be given various modes of qualification verification using the attribute certificate validation device according to the embodiment of the present invention. In FIG. 14, the attribute certificate validation device 130 includes a trust anchor information control function to store a public key certificate of a trusted certification authority. On the basis of to-be-signed data, a signature value, and an attribute certificate from the user device 140, the service provider device 150 generates validation request data including signature verification information, the signature value, and the attribute certificate information (attribute certificate) and transmits the validation request data to the attribute certificate validation device 130.

The device 130 checks authenticity of the holder by use of the validation request data, the trust anchor information (the public key certificate of the certification authority) from the service provider device 150 and the public key certificate of the user (subject) obtained from the certification authority. Moreover, the device 130 checks integrity of the attribute certificate using the attribute certificate and the public key certificate of the certification authority and then returns a result of the verification to the service provider device 150.

In a specific validation method of the attribute certificate validation device 130, the device receives the validation request data from the service provider device; checks authenticity of a holder of the attribute certificate by constructing a certification path, verifying the path, and conducting a validity check for the path by use of the signature verification information contained in the validation request data, the signature value generated by the private key corresponding to the public key certificate of the subject, the attribute certificate linked with the public key certificate of the subject, a public key certificate of a trusted certification authority device beforehand stored in the attribute certificate validation device, and the public key certificate of the subject acquired from the certification authority device according to contents described in the attribute certificate, and checks integrity of the contents of the attribute certificate by constructing a certification path, verifying the path, and conducting a validity check for the path by use of the attribute certificate linked with the public key certificate of the subject contained in the validation request data and the public key certificate of a trusted certification authority to thereby generate validation response data including a validation result of the attribute certificate, and returns the validation response data to the service provider device.

Figure 15:
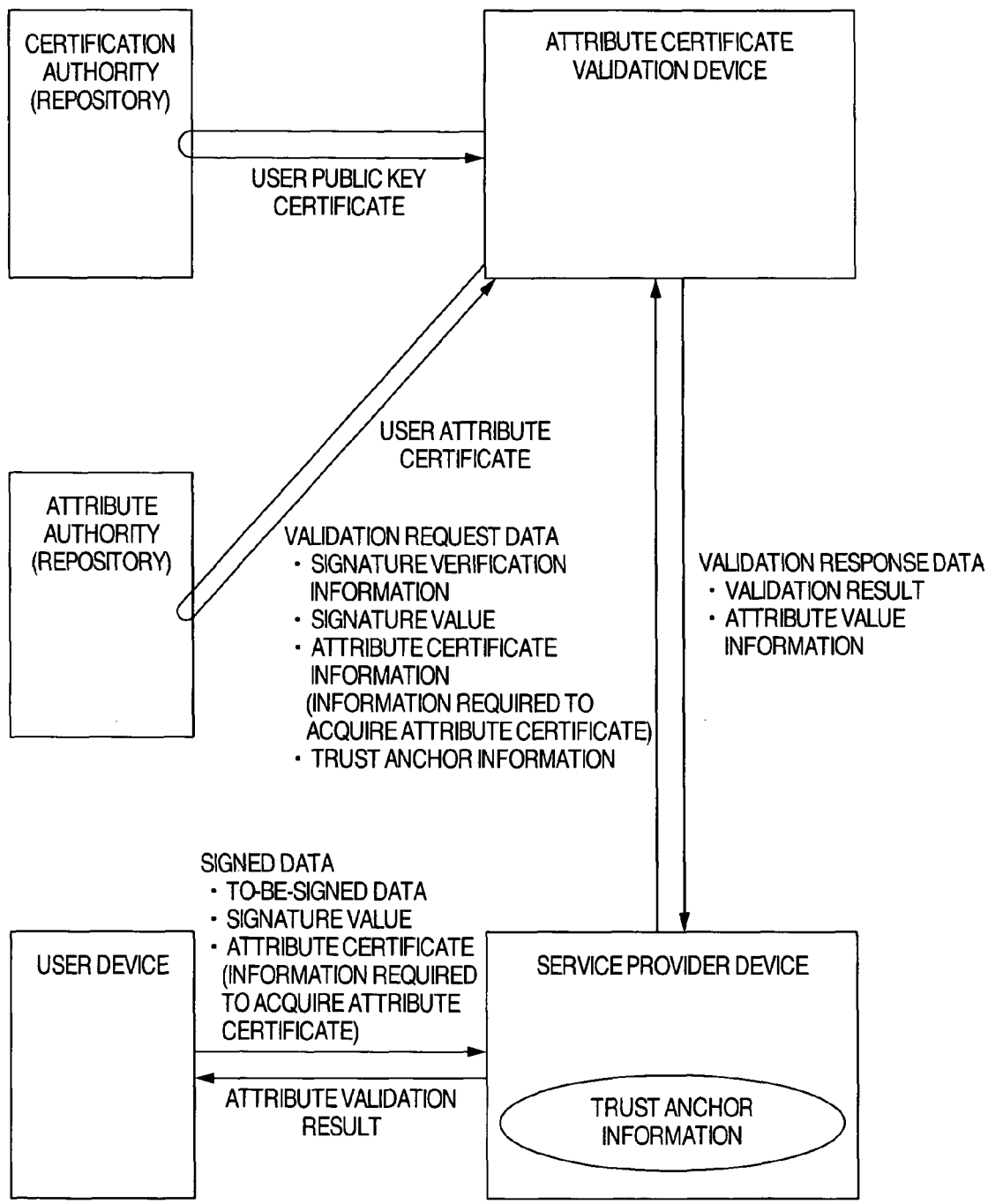
FIG. 15 is a diagram exemplifying another mode of qualification verification using an attribute certificate validation device according to an embodiment of the present invention.

In FIG. 15, the service provider device 150 has a trust anchor information control function. The device 150 generates, according to the to-be-signed data, the signature value, and the attribute certificate information from the user device 140; the validation request data including the signature verification information, the signature value, information to acquire the attribute certificate, and the trust anchor information and then transmits the validation request data to the attribute certificate validation device 130. The device 130 checks authenticity of the user and integrity of the attribute certificate according to the validation request data from the service provider device 150, the attribute certificate from the attribute authority, and the public key certificate obtained from the certification authority, and then returns a validation result and the attribute certificate or the attribute value to the service provider device 150.

In a specific validation method of the attribute certificate validation device 130, the device receives the validation request data from the service provider device; checks authenticity of a holder of the attribute certificate by constructing a certification path, verifying the path, and conducting a validity check for the path by use of the signature verification information contained in the validation request data, the signature value generated by the private key corresponding to the public key certificate of the subject, the attribute certificate obtained from the attribute authority device according to information required to acquire the attribute certificate linked with the public key certificate of the subject, a public key certificate of a certification authority device trusted by the service provider device, and the public key certificate of the subject acquired from the certification authority device according to contents described in the attribute certificate acquired as above, and checks integrity of the contents of the attribute certificate by constructing a certification path, verifying the path, and conducting a validity check for the path by use of the attribute certificate acquired as above and the public key certificate of the certification authority device trusted by the service provider device and contained in the validation request data, to thereby generate validation response data including a validation result of the attribute certificate and the attribute value information, and returns the validation response data to the service provider device.

Figure 16:
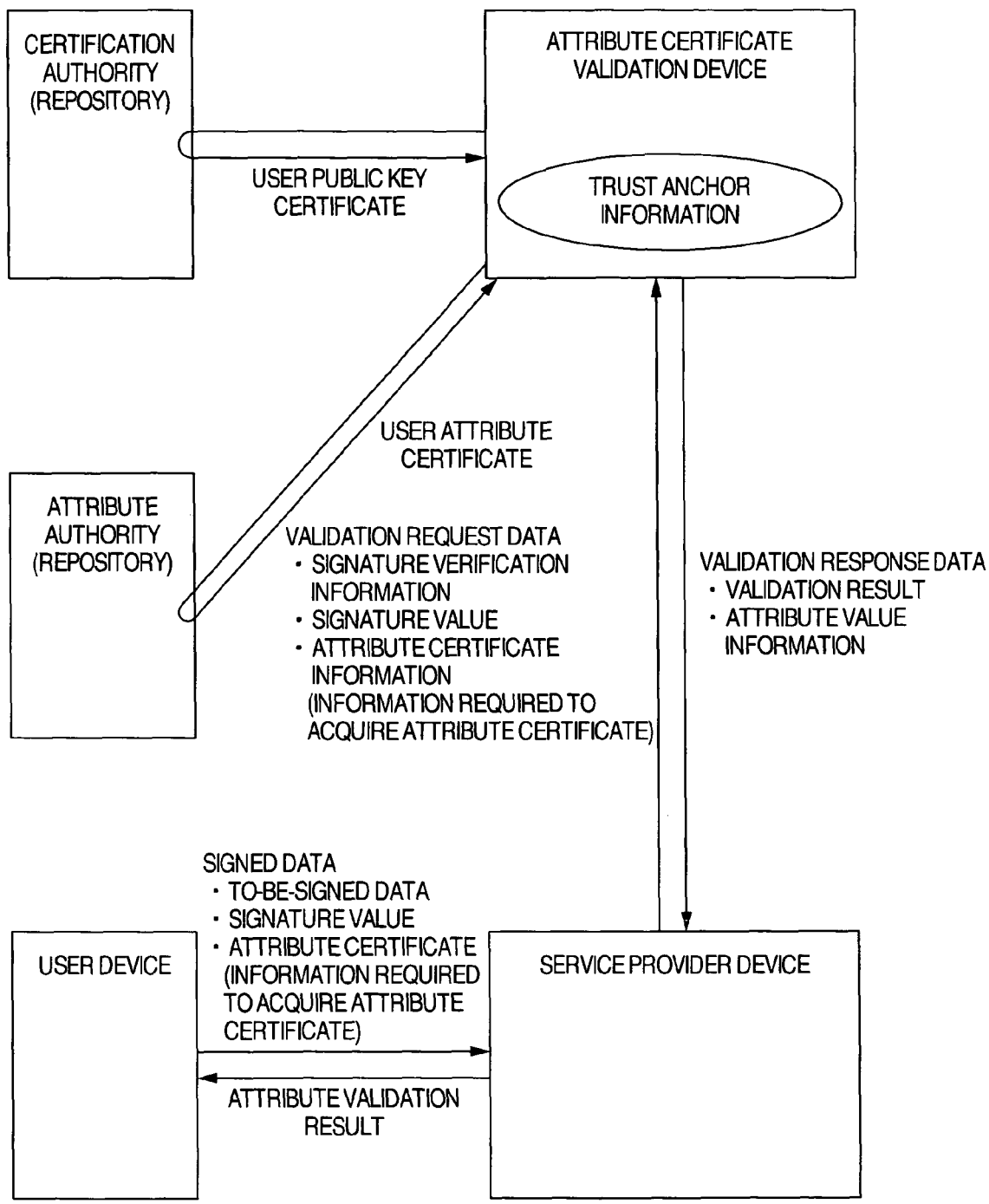
FIG. 16 is a diagram exemplifying another mode of qualification verification using an attribute certificate validation device according to an embodiment of the present invention.

In FIG. 16, the attribute certificate validation device 130 has a trust anchor information control function. The service provider device 150 generates, according to the to-be-signed data, the signature value, and the information required to acquirer an attribute certificate from the user device 140; the validation request data including the signature verification information, the signature value, and the information required to acquirer an attribute certificate and then transmits the validation request data to the attribute certificate validation device 130. The device 130 checks authenticity of the user and integrity of the attribute certificate according to the validation request data from the service provider device 150, the attribute certificate from the attribute authority, the public key certificate obtained from the certification authority, and the trust anchor information, and then returns a validation result and the attribute certificate or the attribute value to the service provider device 150.

In a specific validation method of the attribute certificate validation device 130, the device receives the validation request data from the service provider device; checks authenticity of a holder of the attribute certificate by constructing a certification path, verifying the path, and conducting a validity check for the path by use of the signature verification data contained in the validation request data, the signature value generated by the private key corresponding to the public key certificate of the subject, the attribute certificate obtained from the attribute authority device according to information required to acquire the attribute certificate linked with the public key certificate of the subject, a public key certificate of a trusted certification authority device beforehand stored in the attribute certificate validation device, and contents described in the attribute certificate acquired as above, and checks integrity of the contents of the attribute certificate by constructing a certification path, verifying the path, and conducting a validity check for the path by use of the attribute certificate acquired as above and the public key certificate of the trusted certification authority device to thereby generate validation response data including a validation result of the attribute certificate and the attribute value information, and returns the validation response data to the service provider device.

As described above, the embodiment of the present invention is primarily featured that the embodiment is configured on the basis of the following technical viewpoint. That is, the embodiment has an object in which while keeping safety of the public key infrastructure technology, a qualification is verified on a network without giving privacy information capable of identifying an entity described as a subject of a public key certificate to the verifier side; and there is prepared an environment in which only an attribute certificate validation device operated by a trusted third party can access a public key certificate of a user, the verifier transmits attribute certificate information and signed data information received from a user having presented a qualification, to the attribute certificate validation device to thereby request the device to make a check to confirm authenticity of the holder of the attribute certificate, thereby implementing a method in which the contents of the public key certificate of the user are not notified to the verifier.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. An attribute certificate validation method for a service provider device providing services on a network to check attribute information of a subject using the services, comprising the steps of:
   a signed data transmitting step, conducted by a user device utilized by the subject, in which the device generates signed data including to-be-signed data which is data required to receive a service provided by the service provider device, a signature value generated when a digital signature is made to the to-be-signed data using a private key corresponding to a public key Certificate of the subject, and attribute certificate information required for an attribute certificate validation device to check integrity of an attribute described in the attribute certificate;
   verifies the authenticity of a holder who presents the attribute certificate to the service provider by contracting a certification path for certifying the public key certificate, verifying the public key certificate and checking validity of the public key certificate using the signature verification information and the signature value in the validation request data, the obtained public key certificate of the subject and the trust anchor information,
   in the validation response transmitting step, adds the authenticity validation result of the attribute certificate holder to the validation response data;
   wherein the attribute certificate validation device conducting the attribute certificate validating step is a trusted third party device excluding access by the service provider device to the public key certificate or any privacy information contained in the public key certificate.

2. An attribute certificate validation method according to claim 1, wherein the signature verification information is data to be signed.

3. An attribute certificate validation method according to claim 1, wherein the signature verification information is a hash value of data to be signed.

4. An attribute certificate validation method according to claim 1, wherein the attribute certificate information is an attribute certificate of the subject.

5. An attribute certificate validation method according to claim 1, wherein
   the attribute certificate information is information which uniquely identifies an attribute certificate of the subject; and
   the attribute certificate validating step further includes a step for acquiring an attribute certificate of the subject according to the attribute certificate information; and
   the validation response transmitting step includes a step for setting, as the validation response data, attribute value information including an attribute value in the attribute certificate.

6. An attribute certificate validation method according to claim 1, wherein the trust anchor information is a public key certificate of a certification authority device trusted by an attribute certificate validation device side.

7. An attribute certificate validation method according to claim 1, wherein
   the trust anchor information is a public key certificate of a certification authority device trusted by a service provider device side; and
   the validation request data transmitting step further includes a step for setting the trust anchor information as one constituent element of the validation request data.

8. A non-transitory processor-readable recording medium embodying at least one program providing services on a network to check attribute information of a subject using the services, the program carried out by at least one electronic processor, for effecting processes comprising:
   a validation request data receiving process to receive a validation request data from a service provider device, where the validation request data includes signature verification information which can be calculated using to-be-signed data in a signed data and which is required for an attribute certification validation device to check a signature value in the signed data, and an attribute certificate information in the signed data, wherein the signed data not including information specifying the subject and the public key certificate of the subject, and where the attribute certificate is compliant with an ITU's (International Telecommunication Union's) ITU-T recommendation X.509;
   a trust anchor acquiring process to acquire trust anchor information: an attribute certificate validating process to check integrity of contents of the attribute certificate by constructing a certification path for certifying the attribute certificate, verifying the path, and checking validity of the path by use of a trust anchor information acquired by a trust anchor acquiring process, and an attribute certificate obtained from the attribute certificate information in the validation request data, a validation response data generating process to generate validation response data according to a validation result of the attribute certificate validating process; and a validation response data returning process to return the validation response data to the service provider device, wherein, in the attribute certificate validating process, the attribute certificate validation device; obtains the public key certificate of the subject from a certification authority device according to contents described in the attribute certificate;

verifies the authenticity of a holder who presents the attribute certificate to the service provider by contracting a certification path for certifying the public key certificate, verifying the public key certificate and checking validity of the public key certificate using the signature verification information and the signature value in the validation request data, the obtained public key certificate of the subject and the trust anchor information, in the validation response transmitting step, adds the authenticity validation result of the attribute certificate holder to the validation response data, Wherein the attribute certificate validation device conducting the attribute certificate validating step is a trusted third party device excluding access by the service provider device to the public key certificate or any privacy information contained in the public key certificate.

9. A non-transitory processor-readable recording medium according to claim 8, wherein the signature verification information is data to be signed.

10. A non-transitory processor-readable recording medium according to claim 8, wherein the signature verification information is a hash value of data to be signed.

11. A non-transitory processor-readable recording medium according to claim 8, wherein the attribute certificate information is an attribute certificate of the subject.

12. A non-transitory processor-readable recording medium according to claim 8, wherein:
the attribute certificate information is information which uniquely identifies an attribute certificate of the subject;
in the attribute certificate validating process, the attribute certificate acquired from the attribute certificate information in the validation request data is acquired by the attribute certificate validating device from the attribute authority device; and
in the validation response data generating process, attribute value information including an attribute value in the attribute certificate is set as the validation request data.

13. A non-transitory processor-readable recording medium according to claim 8, wherein:
in the trust anchor acquiring process, the trust anchor information is a public key certificate of a certification authority device trusted by an attribute certificate validation device side; and
the trust anchor information is acquired from the attribute certificate validation device.

14. A non-transitory processor-readable recording medium according to claim 8, wherein:
in the trust anchor acquiring process, the trust anchor information is a public key certificate of a certification authority device trusted by a service provider device side; and
the trust anchor information is acquired from the validation request data received from the service provider device.

15. An attribute certificate validation method for a service provider device providing services on a network to check attribute information of a subject using the services, comprising the steps of:
a signed data transmitting step, conducted by a user device utilized by the subject, in which the device generates signed data including to-be-signed data which is data required to receive a service provided by the service provider device and transmits the signed data to the service provider device, a signature value generated when a digital signature is made to the to-be-signed data using a private key corresponding to a public key certificate of the subject, and attribute certificate information required for an attribute certificate validation device to check integrity of an attribute certificate linked with the public key certificate of the subject, where the signed data not including information specifying the subject and the public key certificate of the subject, and where the attribute certificate is compliant with an ITU's (International Telecommunication Union's) ITU-T Recommendation X.509;

a validation request data transmitting step, by the service provider device, in which the device receives the signed data from the user device, generates validation request data including signature verification information which can be calculated using the to-be-signed data in the signed data and which is required for the attribute certification validation device to check the signature value, the signature value in the signed data, and the attribute certificate information in the signed data, and transmits the validation request data to an attribute certificate validation device delegating validation of the attribute certificate;

an attribute certificate validating step, conducted by the attribute certificate validation device, in which the device receives the validation request data from the service provider device, and checks integrity of contents of the attribute certificate by constructing certification path for certifying the attribute certificate, verifying the path, and checking validity of the path by use of a trust anchor information necessary to construct a certification path, and an attribute certificate obtained from the attribute certificate information in the validation request data, a validation response transmitting step, by the attribute certificate validation device, in which the device generates validation response data including a validation result of the validation step and returns the validation response data to the service provider device; and an attribute validation result transmitting step, conducted by the service provider device, in which the device receives the validation response data from the attribute certificate validation device and transmits the verification result regarding attributes of the subject to the user device according the validation result of the attribute certificate contained in the validation response data, wherein, in the attribute certificate validating step, the attribute certificate validation device; obtains the public key certificate of the subject from a certification authority device according to contents described in the attribute certificate;

verifies the authenticity of a holder who presents the attribute certificate to the service provider by contracting a certification path for certifying the public key certificate, verifying the public key certificate and checking validity of the public key certificate using the signature verification information and the signature value in the validation request data, the obtained public key certificate of the subject and the trust anchor information, in the validation response transmitting step, adds the authenticity validation result of the attribute certificate holder to the validation response data;

wherein the attribute certificate validation device conducting the attribute certificate validating step is a trusted third party device excluding access by the service provider device to the public key certificate or any privacy information contained in the public key certificate.

* * * * *